United States Patent [19]
Richter et al.

[11] Patent Number: 5,630,061
[45] Date of Patent: May 13, 1997

[54] SYSTEM FOR ENABLING FIRST COMPUTER TO COMMUNICATE OVER SWITCHED NETWORK WITH SECOND COMPUTER LOCATED WITHIN LAN BY USING MEDIA ACCESS CONTROL DRIVER IN DIFFERENT MODES

[75] Inventors: Roger K. Richter; Robert O. Sharp, both of Round Rock; Quentin H. Stephenson, Austin, all of Tex.

[73] Assignee: International Business Machines Corporation, Armonk, N.Y.

[21] Appl. No.: 49,895

[22] Filed: Apr. 19, 1993

[51] Int. Cl.⁶ .................................................. G06F 13/00
[52] U.S. Cl. ........................... 395/200.02; 370/352
[58] Field of Search ................................. 395/275, 200; 365/200.02, 200.06, 200.1, 200.12, 200.2; 370/60, 94.1

[56] References Cited

U.S. PATENT DOCUMENTS

| | | | |
|---|---|---|---|
| 4,926,375 | 5/1990 | Mercer et al. ................... | 395/200.13 |
| 5,031,174 | 7/1991 | Natsume ........................... | 370/85.5 |
| 5,060,228 | 10/1991 | Tsutsui et al. ................... | 370/85.13 |
| 5,079,764 | 1/1992 | Orita et al. ...................... | 370/85.13 |
| 5,086,426 | 2/1992 | Tsukakoshi et al. .............. | 370/85.13 |
| 5,088,090 | 2/1992 | Yacoby .............................. | 370/85.13 |
| 5,144,622 | 9/1992 | Takiyasu et al. ................. | 370/85.13 |
| 5,280,481 | 1/1994 | Chang et al. ..................... | 370/85.13 |
| 5,301,303 | 4/1994 | Abraham et al. ................. | 395/500 |
| 5,307,347 | 4/1994 | Doault ............................... | 370/85.1 |
| 5,329,619 | 7/1994 | Page et al. ........................ | 395/200.01 |

*Primary Examiner*—Thomas C. Lee
*Assistant Examiner*—Moustafa Mohamed Meky
*Attorney, Agent, or Firm*—Jeffrey S. LaBaw; David H. Judson

[57] ABSTRACT

A plurality of media access control drivers are coupled to and provide a respective channel to connect a computer and the switched network. Each media access control driver has a first mode in which a connection is established in the switched network and a second mode in which the local area network protocol is passed over the switched network. The media access control drivers may also be placed in a third and fourth mode which allow communication in an unformatted and non-LAN based protocol. The architecture also includes at least one port connection manager which manages one of the channels when the respective media access control driver is in the first mode and a connection manager to manage a status of the connection. The media access control drivers are coupled to a protocol driver to send messages in the local area network protocol when the media access control drivers are in the second mode. Each of the media access control drivers include a table of parameters which describe the channel and a set of entry points to the channel. A protocol manager catalogs the tables for use by other modules.

24 Claims, 11 Drawing Sheets

SYSTEM FOR ENABLING FIRST COMPUTER TO COMMUNICATE OVER SWITCHED NETWORK WITH SECOND COMPUTER LOCATED WITHIN LAN BY USING MEDIA ACCESS CONTROL DRIVER IN DIFFERENT MODES

BACKGROUND OF THE INVENTION

This invention relates generally to communication within a network of computer systems. More particularly, it relates to an extension of a standard local area network based architecture to allow connections from a remote workstation to a local area network over a switched network such as the public switched telephone network (PSTN).

It is becoming increasingly prevalent to couple large numbers of computer systems into a network. The most typical network is called a local area network as the computer systems are located within a limited distance of each other and hard wired into a network, such as a Token Ring or EtherNet. Many industry standards, IEEE and International Standards, have been written for LAN architectures. The IEEE/ISO architectures are particularly prominent and most local area network applications and protocol drivers have been written for the specification.

A wide area network (WAN), which relies on the public switched telephone network to allow connections from remote workstations to LANs, is becoming more popular and cost effective for low usage connections to permanently connected networks. However, most of the applications, protocols, protocol drivers and other code modules of the LAN based architectures are designed for the permanent type of connections, which local area networks offer. It would be extremely advantageous to be able to support existing LAN applications on a remote workstation connected over the public switched telephone network using a typical X-series or V-series modem.

Some attempts have been made to provide remote workstations to a LAN. In general, however, the prior art has relied on proprietary hardware and software which is only marginally compatible with existing LAN applications and standards. Typically, only a single protocol and connection type can be sent between stations which may not be that to which a desired LAN application is written. It would be preferable to support the range of protocols and connection types used by existing applications. Further, it would be preferable to design an architecture which allows for future extensions to hitherto undocumented protocols.

This invention teaches such a method and system.

SUMMARY OF THE INVENTION

Therefore, it is an object of the present invention to expand an existing local area network architecture to support non-LAN connections and new technologies without causing any significant change, if any at all, to LAN protocol stacks and LAN applications.

It is another object of the invention to operate existing communication applications unchanged over various protocols in a real-time fashion.

It is another object of this invention to create a MAC architecture which has room for growth and expandability to support X- & V-Series WAN, ISDN WAN, ISO-LAN, cellular, infrared and PCMCIA environments without major modification.

It is another object of this invention to allow LAN non-LAN protocols as well as unformatted data to be passed over the same network.

These objects and others and further features and advantages are accomplished by an architecture based on a plurality of media access control drivers each coupled to and providing a respective channel to connect the first computer and the switched network. Each media access control driver has a first mode in which a connection is established in the switched network and a second mode in which the local area network protocol is passed between the first and second computers over the switched network. The media access control drivers may also be placed in a third and fourth mode which allow communication in an unformatted and non-LAN based protocol. The architecture also includes at least one port connection manager which manages one of the channels when the respective media access control driver is in the first mode and a connection manager to manage a status of the connection. The media access control drivers are coupled to a protocol driver to send messages in the local area network protocol when the media access control drivers are in the second mode. Each of the media access control drivers include a table of parameters which describe the channel and a set of entry points to the channel. A protocol manager catalogs the tables for the other modules.

BRIEF DESCRIPTION OF THE DRAWINGS

These and other features and advantages will be more easily understood with reference to the attached drawings and following description.

DETAILED DESCRIPTION OF THE DRAWINGS

The invention may be run on a variety of computers in a collection of computers under a number of different operating systems. The computer could be, for example, a personal computer, a mini computer or a mainframe computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM) for more information on the IBM OS/2 2.0 Operating System the reader is referred to *OS/2 2.0 Technical Library, Programming Guide Vol.* 1, 2, 3 *Version* 2.00 Order Nos. 10G6261, 10G6495, 10G6494.

Figure 1:
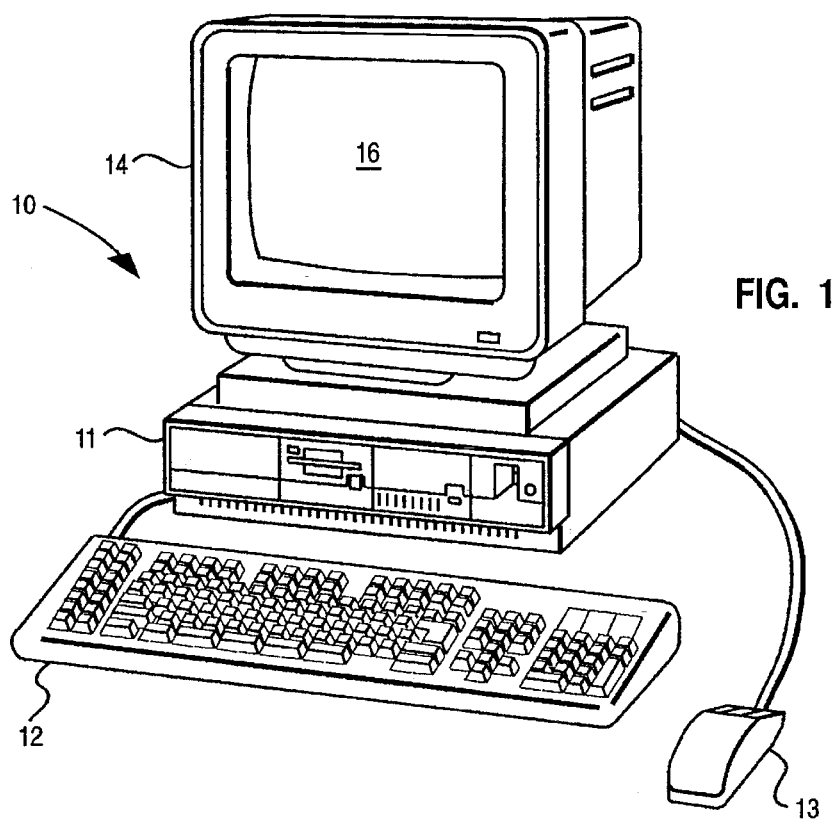
FIG. 1 shows a computer system comprising system unit, system display keyboard and mouse.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user command or selection.

Figure 2:
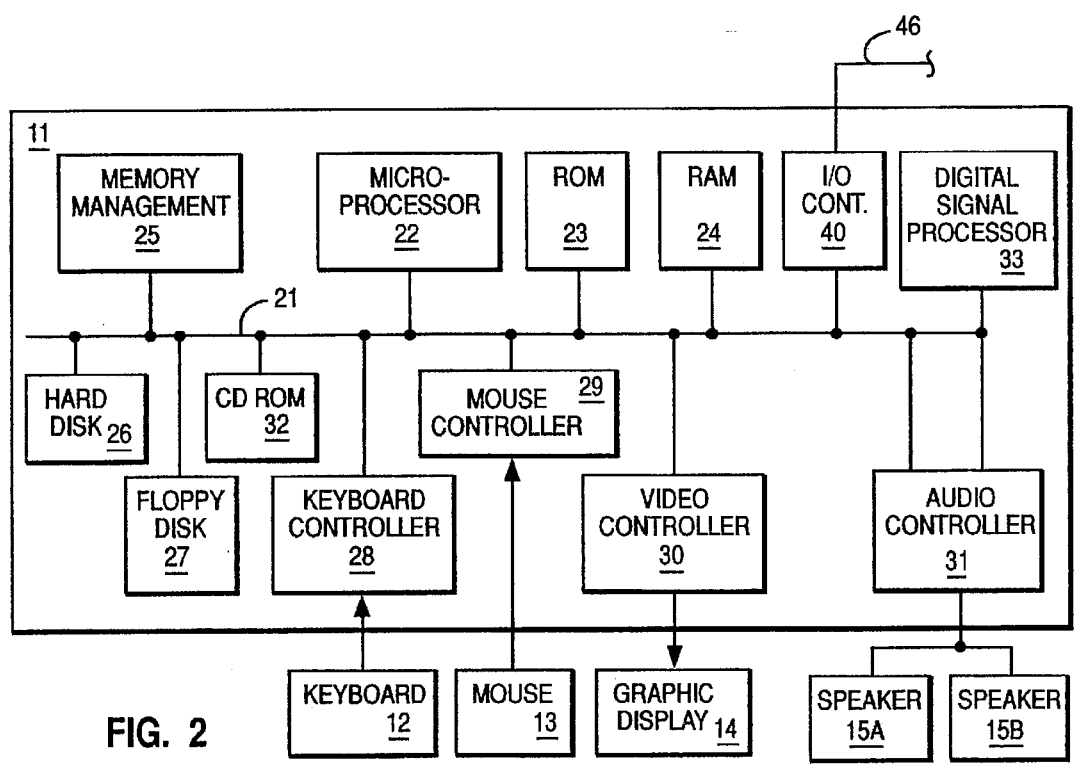
FIG. 2 depicts the components of the computer system in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors included, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific: computer.

The ROM 23 contains among other code the Basic Input-Output system (BIOS) which controls basic: hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: the keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. An I/O controller 40 such as a Token Ring Adapter enables communication over a network 46 to other similarly configured data processing systems.

One of the preferred implementations of the present invention is as sets of instructions in a plurality of code modules resident in the random access memory. Until required by the computer system, a set of instructions may be stored on a computer readable medium, for example, the hard disk in hard disk drive 26, optical disk in the CD ROM 32 or a floppy disk in the floppy disk drive 27.

Figure 3:
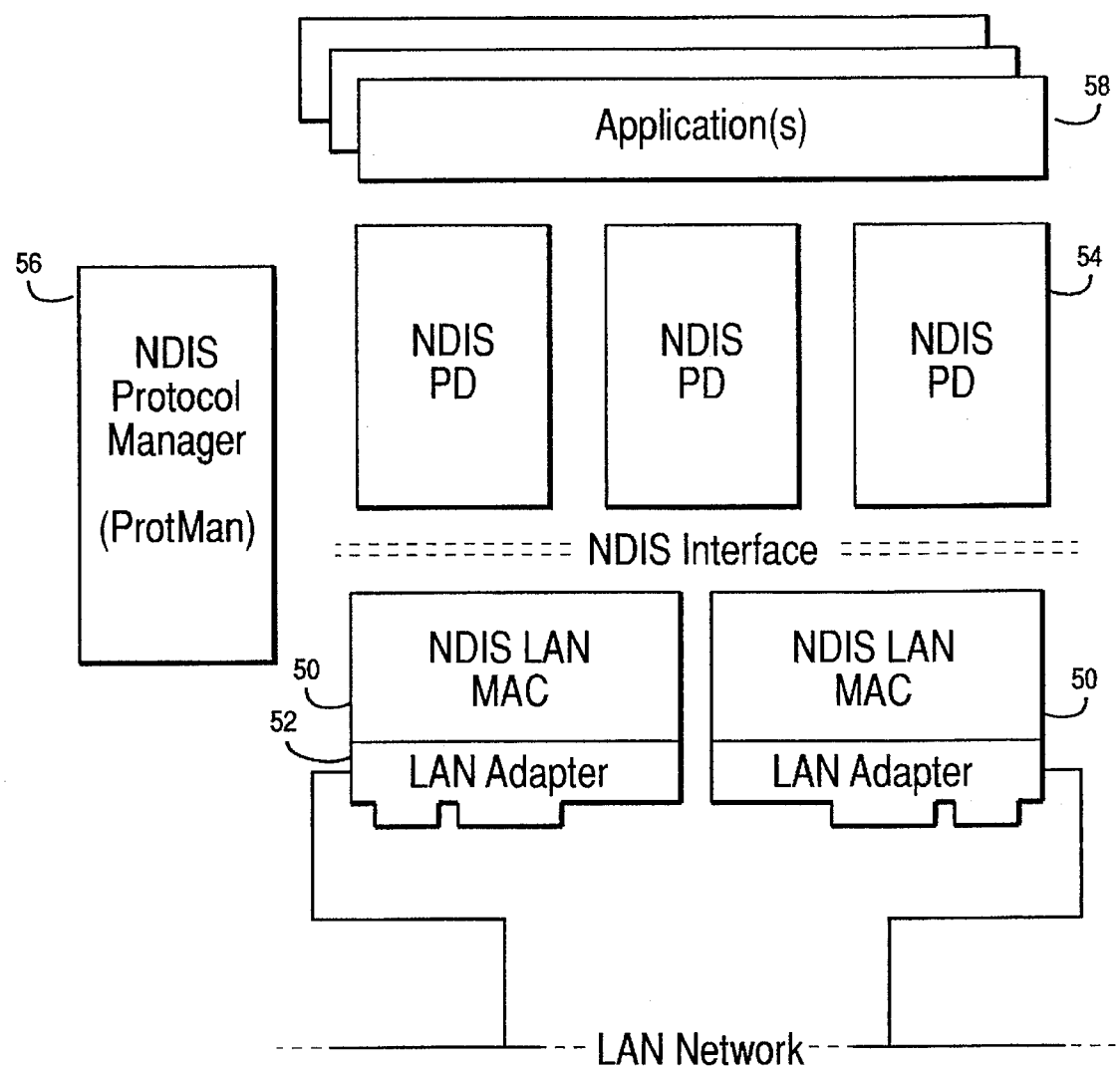
FIG. 3 is an architectural diagram of a prior art LAN network architecture.

The NDIS environment is an industry standard for DOS, Windows and OS/2 personal computers and is modeled after the Institute of Electrical and Electronic Engineers (IEEE) and the International Standards Organization's (ISO) LAN architecture. This environment, is a real-time communications environment oriented towards the support of Local Area Networks and other permanent connections. In the NDIS environment, as depicted in FIG. 3, there are several types of entities.

Media Access Control (MAC) drivers 50 are communication device drivers which perform the hardware management necessary for the sending and receiving of frames of data and physical link control. In the NDIS environment, MACs "hide" hardware such as LAN adapter 52 and LAN 46, and network unique operational characteristics from other NDIS entities by implementing NDIS' prescribed MAC interface. Although this MAC interface is the same for all MACs, it allows MACs to support various attributes. Also, the NDIS MAC interface requires MACs to identify what connection type and data stream is supported via a field called "MAC Type". NDIS defines the following MAC types: IEEE 802.3, IEEE 802.4, IEEE 802.5, HDLC, ISDN, X.25, DIX, DIX+802.3, ASYNC, SDLC, FDDI, IEEE 802.6 ARCNET and APPLETALK. These type values identify a MAC's supported data stream and, in most cases, the type of attached network. Currently, in NDIS, MAC types are static and do not change.

Protocol Drivers (PDs) 54 are the device drivers which contain the protocol procedures necessary for data flow control and error free delivery and routing of data. PDs 54 are the next layer up from MACs 50 in all of the communications, IEEE and ISO, architectures. Since the NDIS environment provides an architected interface between MACs and PDs, the Protocol Drivers are, in most cases, MAC independent. This independence is gained by not being tied to the operational characteristics of any specific set of hardware. Protocol Drivers 54 usually support multiple types of MACs 50 and use the MAC type field in each MAC to determine if the two entities are compatible. Protocol Drivers 54 are supplied by most communications products whereas MAC drivers 50 are usually supplied by OEM hardware/adapter providers. This allows the user the ability to mix and match different protocols with various types of hardware.

The NDIS Protocol Manager 56 gathers, maintains and supplies all of the NDIS configuration information for the purpose of setting up all of the NDIS protocol stacks. To the NDIS Protocol Manager 56, all PDs 54 and MACs 50 are "modules". All NDIS modules register with the NDIS Protocol Manager. After all NDIS modules have registered, the Protocol Manager 56 then is the entity responsible to match up and "glue" the appropriate PDs 54 and MACs 50 together in an NDIS process called "Binding". The Binding process is driven by NDIS configuration information. It is during the Binding process that PDs 54 and MACs 50 determine if they are compatible or not. If they are, the Bind processing completes successfully and the two entities are usually permanently bound together to form various protocol stacks. A protocol stack refers to a protocol driver bound to a MAC with some higher layer API.

At the highest level in the NDIS architecture are the LAN applications 58 which use the NDIS modules to communicate over the LAN 46. Typically, the applications are distributed in the network as client and server applications or peer-to-peer applications.

The architectural extensions of the present invention to the base NDIS 2.0.1 specification entitled, "3COM/Microsoft LAN Manager Network Driver Interface Specification", Version 2.0.1, published Oct. 8, 1990, and available from the 3COM or Microsoft Corporations, are driven by the requirements to support Wide Area Networks (WANs), HDLC oriented Protocol Drivers, the new Personal Computer Memory Card Interface Association (PCMCIA) standard adapters, wireless connectivities, and Isochronous LANs (ISO LANs) in addition to the current NDIS LAN environment. The commonality of these additional requirements is that the physical layer connections in each case require some manner of connection management. The term connection management indicates that each connection type or attached network requires a some form of a protocol for the management and maintenance of the physical medium. This is due to the fact that the underlying medium is usually dynamic in some fashion (i.e., connection establishment and disestablishment, channel or port selection, band-width allocation, hardware insertion/retraction, etc.).

The present invention isolates these connection specific characteristics from the native NDIS operations. This allows NDIS PDs, whether existing or new, LAN or HDLC oriented, to execute unchanged (except for minor configuration changes for timer values, etc.) over multiple connection types. Another unique feature associated with the non-LAN connections, such as X & V-series and ISDN WANs, is that the underlying medium is protocol insensitive. In other words, though each connectivity may incorporate a different technique for encoding their bit streams, the framing techniques used for data transmission are consistent without regard for the internal contents of the frames. This means that over the same wire, at different instances, one could run IEEE 802.5, IEEE 802.3, X.25 Link Access Procedure-Balanced (LAPB), ISDN Data Link Control (IDLC), and Synchronous Data Link (SDLC) packets, for example. The invention envisions mechanisms which allow MACs to support varied data streams at different time instances.

The invention's functional extensions to NDIS are primarily related to two areas:

1. Connection Management, and
2. New MAC types and/or new MAC functions.

Figure 4:
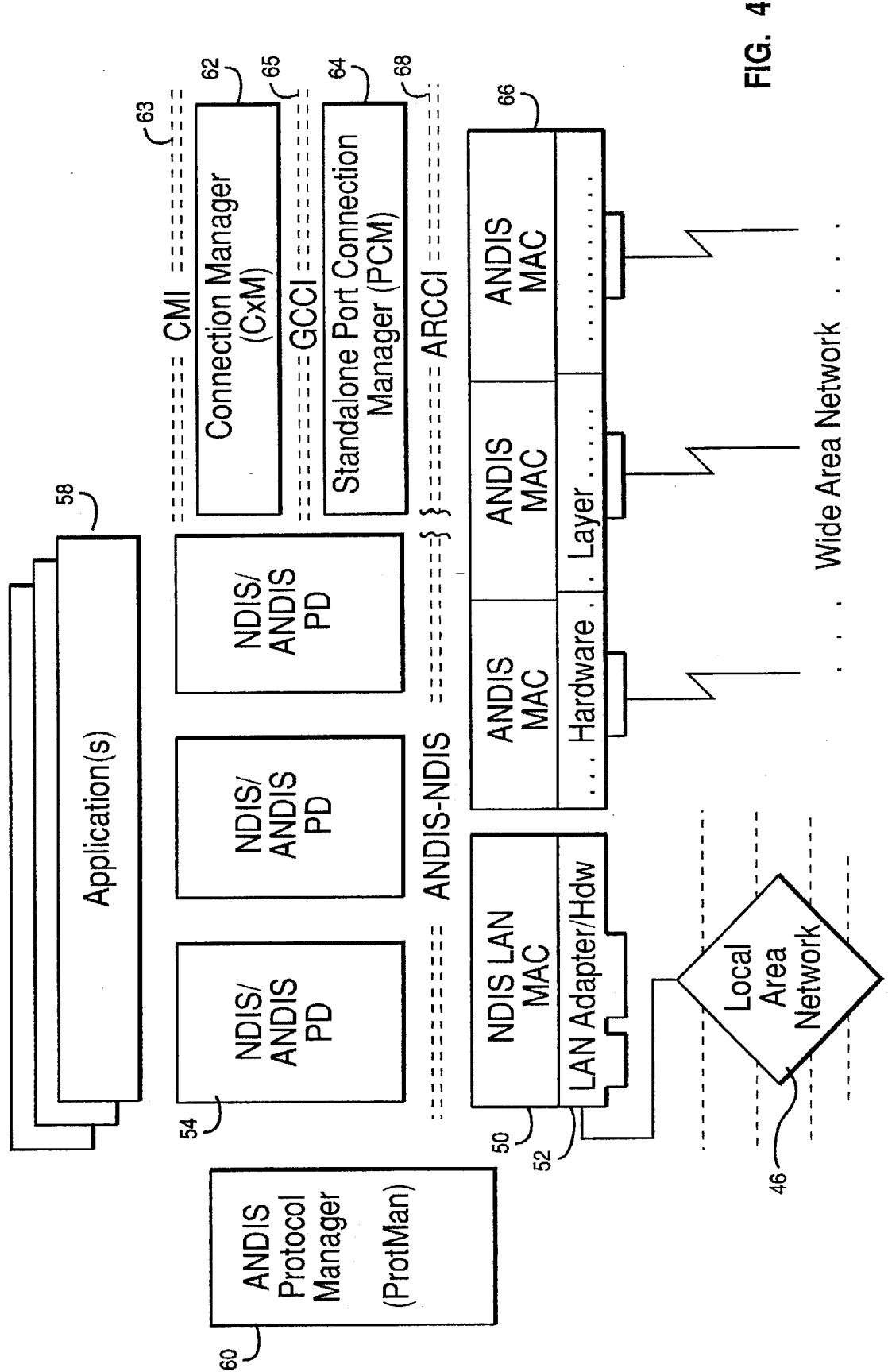
FIG. 4 is an architectural diagram of the code modules of the present invention.

As shown in FIG. 4, the Advanced Network Driver Interface Specification (ANDIS) architecture is a compatible superset of the existing NDIS architecture. With the support of additional types of networks, connectivities and protocols, there are now several types, or "flavors", of ANDIS environments that can exist. The present invention allows basic NDIS components such as the MACs 50 and Protocol Drivers 54 and applications to operate basically unchanged. The Protocol Manager 60 has several new responsibilities connected with managing information about non-LAN adapters and modems, but is basically similar to the Protocol Manager in NDIS. The present invention adds the following entities: a Connection Manager 62, Port Connection Managers 64 and ANDIS MACs 66.

The Connection Manager is a functional analog to the Protocol Manager 60. It is the connection-oriented environment manager whereas the Protocol Manager 60 is the protocol-oriented environment manager. The Connection Manager (CXM) 62 is the common focal point for all "managed" connections. The Connection Manager 62 maintains the status and other information about all of the known connections. At its higher boundary, it provides a common API, called the Connection Management Interface (CMI) 63, to applications for the activation, use and deactivation of various types of connections. Underneath, it provides a lower layer interface called the Generalized Call Control Interface (GCCI) 65. The GCCI interface is the communication mechanism between the Connection Manager and the various Port Connection Managers described below which perform the low level connection management.

Port Connection Managers (PCMs) 64 are the entities that actually manage the ports, or channels, directly under their control. PCMs 64 register with the Connection Manager 62, across the GCCI for the provision of port and/or channel control. PCMs 64 support specific types of connections (i.e., X- & V-series Async, ISDN, cellular, ISO-LAN, etc.) since each type of connectivity has its own form of connection management. However, even though PCMs 64 have "types" associated with their form of connection management, they can be designed or packaged in two forms: 1) standalone PCMs, or 2) Integrated PCM Subsystems. Integrated PCM Subsystems are subsystems provided by OEM suppliers that contain a PCM (or PCMs) and MACs in an integrated package. In an integrated PCM, the PCM(s) and MACs act as a single system which has no formal, external interface between the MACs and the PCM(s). This integrated subsystem package is product specific. An example of this type of PCM package would be an OEM provided "deep" adapter where the connection management and physical data transport code is actually outboard on the adapter. In a system without integrated PCMs, one might combine the functions of the CXM and PCM into a single logical entity. In this case, the PCM(s) and MACs in the computer are actually real-time interfaces to the outboard adapter specific code.

A standalone PCM is connection specific, but not necessarily product specific. A standalone PCM has an externalized lower layer interface that conforms to the ANDIS Real-time Connection Control Interface (ARCCI) 68, for PCMs and MACs. All standalone PCMs must "find" the MACs that need their type, or form, of connection management to operate. This is done by getting a list from the ANDIS Protocol Manager 60 of the MACs 66 that support Port Connection Management and then determining which ones need a specific PCM's form of connection control. This process is part of ANDIS' Connection Management Architecture (CMA) which is described later in this document.

The present invention extends the set of MAC functions currently specified by NDIS to encompass connection management via an external (standalone) PCM and to allow what is termed as "Data Modality". ANDIS MACs 66 that require connection management and are not part of a specific integrated PCM Subsystem, support ANDIS Connection Management Architecture (CMA) by implementing the ANDIS Real-time Connection Control Interface (ARCCI). These extensions to NDIS MAC functionality allow PCMs to perform the necessary connection management functions through the ANDIS MACs while maintaining the standard NDIS MAC characteristics. The invention also moves much of the connection management processing from the MACs 66 to the PCMs 64, thus simplifying the amount of processing performed by the MACs. ANDIS MACs 66 that manage media that are not protocol sensitive, such as analog and digital WANs, support LAN 802.5 and HDLC protocols using standard NDIS requests. Optionally, these ANDIS MACs 66 can also support 802.3 and HDLC frame filtering.

Figure 5:
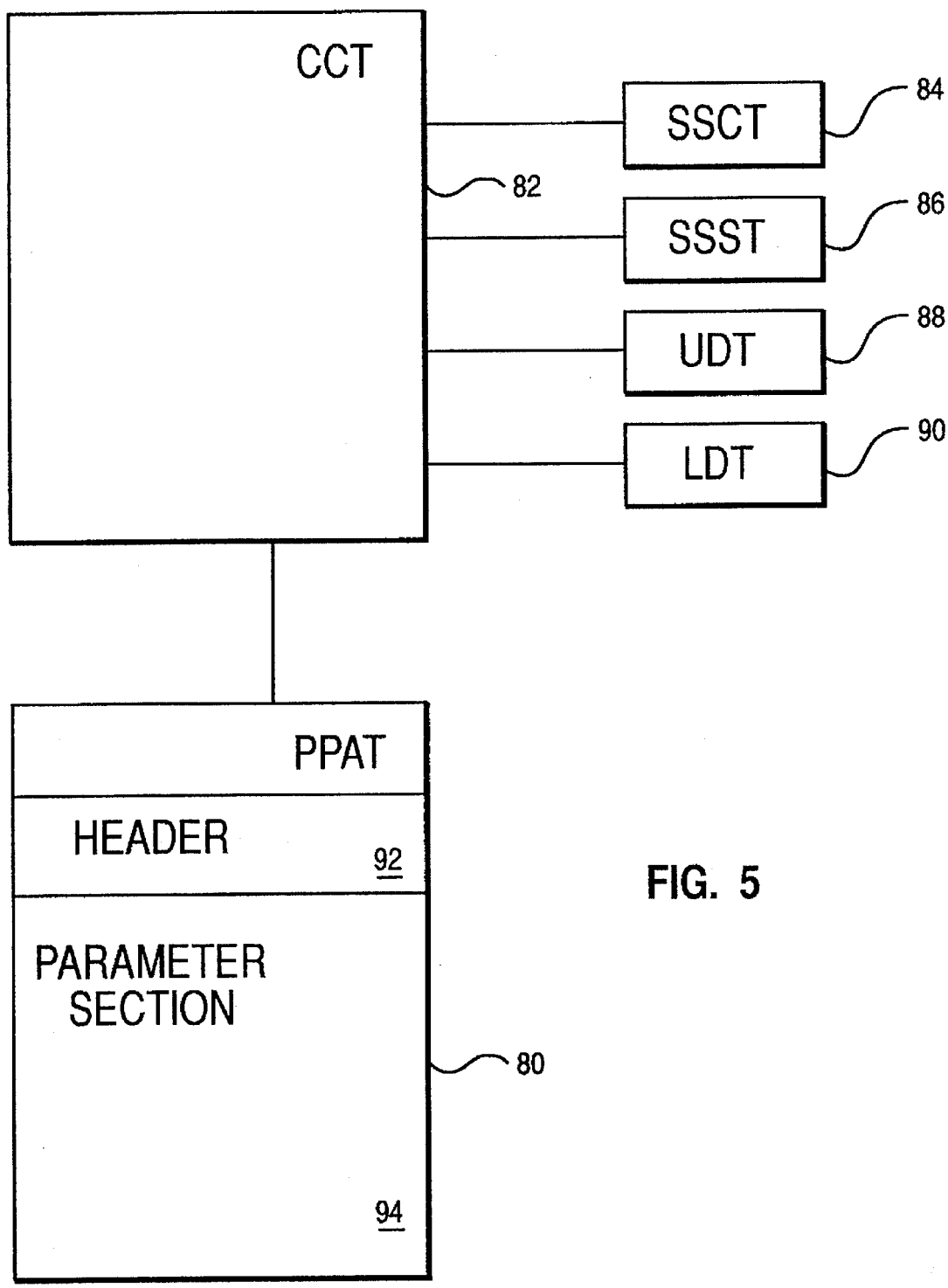
FIG. 5 is an architectural diagram of a media access control layer interface built according to the present invention.

ANDIS MACs 66 that require connection management and are not components of an Integrated PCM Subsystem have a new NDIS table called the Physical Port Attributes Table (PPAT) 80. The data structure of an ANDIS MAC is shown in FIG. 5. The PPAT 80 is an addition to the standard NDIS tables: the Common Characteristics Table (CCT) 82, the Service Specific Characteristics Table (SSCT) 84, the Service Specific Status Table (SSST) 86, the Upper Dispatch Table (UDT; mainly used by MACs) 88, and the Lower Dispatch Table (LDT; used mainly by PDs) 90. The presence of the PPAT is indicated by setting a particular bit in one of the existing tables, for example Bit 18 in the service flags in the MAC's SSCT 84. If this bit is "ON", then the address of the PPAT is stored in the MAC's CCT 82 immediately following the LDT address field (using the first reserved DWORD field). The PPAT 80 consists of two sections: the standardized PPAT header 92 and the PPAT connection specific parameters section 94. The PPAT contains all of the information necessary for connection management to be performed by a PCM, or even an ANDIS PD, through a MAC.

The PPAT includes a field which defines the type of connection management required by the MAC. For example, the MAC might be coupled to a V- or X-series modem, an ISDN basic or primary adapter, a cellular radio adapter, an infrared signal adapter or other switched network adapters. The type of connection is called the Port Interface Type (PIT). Each type of connection will call for a different set of PIT modifiable parameters which are in another field within the PPAT. A field is also set aside for a version number of the PIT modifiable parameters, so that later developed modules will know with which version of the MAC they are dealing.

One very important field in the PPAT is for the ANDIS MAC Mode (or state). The field will tell whether the MAC is in connection mode in which the PCM is controlling the MAC to establish a connection over the switched network or protocol mode in which the MAC is behaving like a LAN-based MAC and passing messages to and from the network in association with a protocol driver. A third mode for raw or unformatted data or data in a non-LAN based format is also available and set by this field. A fourth mode for non-LAN based protocols is also envisioned by the invention allowing future extendibility to as yet undeveloped protocols without fundamental change to the architecture. Thus, not only can a MAC be attached to different protocol drivers on a per call basis, it can also be switched between modes allowing LAN-based, non-LAN based and unformatted communication through the same channel.

Other fields in the PPAT include connection type, e.g., switched or permanent (for a LAN-based MAC), physical connection state, e.g., disconnected, connected, hardware present, port name, port number, slot number, channel number and physical port speed. A field for the port ID is set by the PPAT registration facility in the protocol manager. Several fields contain pointers various entry points to the MAC for registration, configuration and management of the PPAT as well as to other tables in the MAC such as the CCT.

PHYSICAL PORT ATTRIBUTES TABLE (PPAT) FUNCTIONS

The ANDIS Real-time Connection Control Interface (ARCCI) is the interface between standalone ANDIS MACs and PCMs. The basis for this interface is called the Physical Port Attributes Table (PPAT). The PPAT contains both port/connection attributes the entry point addresses of the functions that make up ARCCI. The PPAT contents are described above, the functions that describe and make up ARCCI are described in the following section.

ARCCI PRIMITIVES

The primitives used to call the entry points identified in the PPAT follow the calling convention and format for General Requests in the NDIS Spec version 2.0.1 (p. 43). The ARCCI primitives consist of four categories: Port Management, Port Management Indications, Transmit Immediate Data, and Receive Immediate Data. Port Management and Transmit Immediate Data primitives are issued to a MAC from a PCM using the functions that have entry their points defined in the PPAT. Port Management Indications and Receive Immediate Data primitives are indications sent from the MAC to a PCM using entry points defined by the Register PCM primitive. Two additional categories exist that allow transmitted or received data to be processed asynchronously. These are the Receive Immediate Data and Transmit Immediate Data confirm functions. The term "immediate data" is derived from NDIS definition. Please note that all data primitives contain a virtual address pointer (LPBUF) to a single contiguous buffer of data. Virtual address in OS/2 means a 32-bit selector: offset GDT pointer; in DOS, a standard 32-bit segment: offset pointer.

The details of each primitive are described in the following text.

PORT MANAGEMENT PRIMITIVES: Port Management primitives are issued to the entry pointed to by the Port Management Request Entry Point Address in the PPAT. The following are the Port Management Primitives.

Register_PCM allows a PCM to register its entry points for Port Management Indications, Receive Immediate data, and Transmit Immediate Data Confirm with a MAC. This function is directly analogous to an NDIS Bind and upon successful completion, the MAC's port, or channel, is considered "owned" by the PCM. This means that the MAC's Connection State field in the PPAT is updated accordingly. The Port_id should match the Port ID/Address value in the MAC's PPAT. PCM_Entry_Table Points to an array of three LPFUN values. The first entry is the entry point for Port_Mgmt_Ind (Port Management Indications). The second entry is the entry point for Rcv_Immediate_Data. The third entry point is the address of the routine to handle Transmit Immediate Data Confirm indications.

Release_PCM releases a PCM's ownership of a port designated by the Port_ID parameter. The MAC should no longer call any entry points that the MAC may have for the PCM. It should also terminate any queued requests that it may have in progress. After the MAC has completed this primitive, the MAC should restore all its settings back to its original default state. If any DLC's are currently active, appropriate return codes should be given to any action taken by a DLC to indicate that the connection has been permanently lost.

Activate_Mode is used to switch a MAC between three modes. These three modes are Connection Management mode, NDIS Protocol mode and Unformatted data mode. In connection management mode a MAC will be communicating with a PCM to establish, take down, or manage a physical connection. In NDIS Protocol mode, a MAC will be communicating with a protocol stack via the existing NDIS interface. In Unformatted Data mode, a MAC will be communicating with another module VIA the NDIS extensions called out in this document as if it is in connection mode. In other words, the data is not being framed or modified in any way by the MAC. This will allow use of a port, or channel, in its native mode; for example, an async port could be used by an ASCII terminal emulation product or an ISO-LAN C-channel could support a multimedia data stream while in unformatted data mode.

Retrieve_PPI_Status returns the current Physical Port Interface (PPI) status to a PCM. This function is PIT dependent since the PPI status indicator is PIT specific and not defined as part of the standard PPAT header. The format of the PPI status field is therefore defined by each connection category in its own section of this specification. Some connection types may not support this function. For the support of most connections, a WORD sized field is used for Layer 1 connection status. This function copies the current value in the PPI Status WORD from the PPAT PIT specific parameters section into the WORD pointed to by PPI_Status_Pointer. This primitive is valid only after a Register_PCM has been issued.

Get_PPAT_Parms gets the PPAT PIT specific parameter table. The PPAT PIT specific parameter table is defined as the section of the PPAT following the standard PPAT header. If the PPAT parameter table is bigger than the PPAT_Parm_Size parameter, then BUFFER_TOO_SMALL will be returned and no copy of the PPAT parm table will be performed. No copy of the PPAT is performed, in this case, to ensure that if the PPAT changes, a PCM or DLC does not incorrectly use fields in the PPAT.

The PCM will control access to the PPAT by the use of the Activate_Mode primitive. The PCM has exclusive use of the PPAT until it issues an Activate_Mode to give control to a DLC or Null DLC. Until that point in time, a DLC or Null DLC will receive Invalid_Function in response to an attempt to get the PPAT parameter table. After the Activate_Mode primitive (giving away control), the PCM will receive Invalid_Function if it attempts PPAT access in the incorrect mode. The PCM must switch modes back to PCM Connection Management mode before it can get the PPAT again. This synchronization will eliminate the possibility that a DLC (or Null DLC) and a PCM make different changes to the same PPAT and one overwrites the other. This also implies that a PCM should get a new copy of the PPAT parameter table every time it switches back to PCM mode to determine if any PPAT modifications have occurred. ANDIS MACs ultimately determine how many and what types of PPAT changes can occur.

Set_PPAT_Parms sets, or resets, the PPAT PIT specific parameter table. The PPAT PIT specific parameter table is defined as the section of the PPAT following the standard PPAT header. This function is used by a PCM to reconfigure or set PIT parameters. If the PPAT parameter table is bigger than the PPAT_Parm_Size parameter then BUFFER_TOO_SMALL will be returned and no copy of the PPAT parm table will be performed.

Reset_Port is issued to a MAC to perform a hardware and/or a software reset. It is primarily used after a connection has been disrupted. A hard reset resets the port and all software settings back to their original default states. A soft reset returns any queued requests that a MAC is currently holding. A soft reset can be used to recover from a nonfatal error conditions that terminate connections prematurely.

Activate_Phys_Conn allows a PCM to activate a connection without taking specific actions with regards to the physical connection type. All management of signals to and from the DCE are handed over to the MAC. Any strings or commands that need to be issued to a DCE, or network, are sent using the TransmitImmediateData primitive after issuing this primitive. Due to the nature of this function, the interpretation of this event is PIT specific. If a MAC can raise a connection without PCM intervention or PCM to DCE/network message passing, it attempts to do so upon receipt of this primitive. If the PCM and the attached DCE/network must engage in a Layer 2 (or higher) dialog of some sort, then the MAC is issued this primitive in order for it to prepare for an imminent connection. Once a connection has been established, a Connection_Active Indication is always issued to the owning PCM.

The Mode parameter allows a PCM to go from active to passive control of the associated port/channel by enabling either the NDIS interface (NDIS Protocol Mode) or the Null DLC interface (Unformatted Data mode) without issuing an Activate_Mode primitive. Immediately after issuing a successful Connection_Active Indication, a MAC switches to the appropriate mode and is ready for the receipt and transmission of data. If the PCM maintains a MAC in Connection Management mode, the PCM must later issue an Activate_Mode primitive to activate one of the other data interfaces.

Deactivate_Phys_Conn allows a PCM to deactivate a connection without taking specific actions with regards to the physical connection type. All management of signals to and from the DCE are handed over to the MAC. This primitive differs from Reset_Port in that it does not reset all parameters back to default values. It allows a PCM to reuse a port, or channel, without having to set/reset all the PIT specific parameters again.

Register_Null_DLC allows a Null (Unformatted data stream) DLC to register its entry points for Port Management Indications, Receive Immediate data, and Transmit Immediate Data Confirm with a MAC. The Port_ID is the Port ID/Address value in the PPAT of the port that the Null DLC is attempting to use. The DLC_Entry_Table Points to an array of three LPFUN values. The first entry is the entry point for Port_Mgmt_Ind (Port Management Indications). The second entry is the entry point for Rcv_Immediate_Data. The third entry point with the address of the routine to handle Transmit Immediate Data Confirm indications. This primitive is used mainly for the support of those connections that can support both framed and unframed, or just unframed, data streams such as raw ASCII asynchronous connections and MultiMedia (ISO-LAN) links. It can potentially be used to support proprietary data streams that are manufacturer specific.

Release_Null_DLC releases a Null DLC's ownership of a port designated by the Port_ID parameter. The MAC should no longer call any entry points that the MAC may have for the Null DLC. It should also terminate any queued requests that it may have in progress. Upon successful completion of this primitive, the MAC should return to Connection Management Mode.

PORT MANAGEMENT INDICATIONS

Port Management Indication primitives are issued to the function pointed to by the Port_Mgmt_Ind field of the PCM_Entry_Table as defined by the Register PCM primitive. The following are the Port Management Indication primitives.

Connection_Active indicates to a PCM that a connection is active. This indication notifies a PCM that the MAC has completed an attempt to establish a physical connection. If the PCM specified a mode change in the original Activate_Connection request, the MAC should enter that mode immediately. Otherwise, the PCM should issue an Activate_Mode primitive as soon as is desired to keep from loosing data between mode changes. The PCM, however, in different circumstances, may need exchange data with the network, or DCE, after a connection has been established and it is ultimately the PCMs responsibility to manage the connection state and mode.

Connection_Inactive indicates to a PCM that a connection has gone inactive. If supported, a copy of the PIT specific PPI Status field is returned to help the PCM determine what actions might be needed. A MAC should automatically switch to connection mode before issuing this primitive. A PCM may explicitly set the mode, however this is not required.

PPI_Signal indicates to a PCM that the MAC has detected a change in one or more of the PPI Status signals. This indication is PIT specific or, in other words, connection type dependent. Each connection type has its own PPI Status field defined in the PIT specific parameters section of the PPAT. Each connection type, or PCM type, defines the contents of the PPI status field and the conditions whereby notification is stimulated.

PPI_Exception indicates to a PCM that a MAC has detected an error condition. As with the preceding PPI_Signal indication, this indication is PIT specific. Each connection type defines the error conditions that stimulate notification. The PPI_Exception field, being PIT specific, is defined by each connection type in the PIT specific parameters section of the PPAT.

PortMgmt_Request Complete notifies a PCM that a MAC has completed a primitive that had previously been queued. The value of Status is zero if the request was successful. Info_Pointer is a long pointer to information related to the request. The request being completed is identified by the ReqHandle on this indication; the ReqHandle matches that of the original primitive.

TRANSMIT IMMEDIATE DATA PRIMITIVES

Transmit Immediate Data primitives are issued to the function pointed to by the TransmitImmediateData Request Entry Point Address in the PPAT. Currently, there is only a single transmit primitive defined, or required, as the standard transmit mechanism. However, per connection type, other transmit types can be defined for more specific transmit needs. Any additional primitives are to adhere to the specified calling format. The passed opcodes can be varied to identify Port Interface Type (PIT) specific types of transmissions. Data Primitives:

TransmitImmediateData is used to send data from a PCM to a MAC while in connection mode or from a NULL DLC to a MAC while in Unformatted Data Mode. See the Activate_Mode primitive for more information on the modes. Imm_Data_Pointer is a selector/segment: offset pointer to a contiguous data buffer. In OS/2, this pointer is a GDT pointer. Since PCMs do not usually generate large amounts of data traffic communicating with a DCE or network, and since a contiguous data buffers are used for all transmits (preventing "scatter gather"), MACs are strongly recommended to perform all transmit requests synchronously, if possible. If the buffer passed down to the MAC is too large or if the data cannot be sent immediately (possibly due to implementation) for some reason, it is suggested that the MAC return to the PCM a queued return code.

TRANSMIT IMMEDIATE DATA CONFIRM PRIMITIVES

Transmit Immediate Data primitives are issued to the entry pointed to by the Xmit_Immediate_Data field of the PCM_Entry_Table as defined by the Register PCM primitive. TransmitImmediateDataConfirm notifies a PCM that a MAC has completed a transmit primitive that the MAC had previously queued. The value of Status is zero if the request was successful. Info_Pointer is a long pointer to information related to the request. The request completed is identified by the ReqHandle on this indication. Please reference TranmsitImmediateData request for guidelines concerning the queuing of data transmissions.

RECEIVE IMMEDIATE DATA PRIMITIVES

Receive Immediate Data Confirms are issued to the function pointed to by the ReceiveImmediateDataConfirm Entry Point Address in the PPAT. ReceiveImmediateData Purpose informs a PCM (in Connection mode) or a NULL DLC in (Unformatted Data mode) that a MAC has received data to be processed by the PCM or DLC. Rcv_Data_Pointer is a selector/segment: offset pointer to a contiguous buffer. Under OS/2, this pointer is a GDT pointer.

RECEIVE IMMEDIATE DATA CONFIRM PRIMITIVES

Receive Immediate Data Confirms are issued to the function pointed to by the ReceiveImmediateDataConfirm address field of the PCM_Entry_Table as defined by the Register PCM primitive. ReceiveImmediateDataConfirm notifies a MAC that a previously queued ReceiveImmediateData indication has been completely processed and the accompanying data buffer is free for reuse. The value of Status is zero if the request was successful. Info_Pointer is a long pointer to information related to the request. The request completed is identified by the ReqHandle on this indication.

PPAT MANAGEMENT PRIMITIVES

PPAT Management primitives are issued to the function pointed to by the MAC's PPAT Management Request Entry Point Address in the PPAT. Update PPAT allows the ANDIS Protocol Manager PPAT Registration Facility the ability to update (reconfigure) a MAC's PPAT. If a MAC's connection is inactive, the MAC should accept the PPAT updates (i.e., allow programmatic reconfiguration). If the MAC encounters PPAT values that are configured invalidly it should return with the appropriate return code. If a MAC has an active connection in progress, it can either reject the PPAT update attempt or make a copy of the PPAT for later use. However, active connections are not to be disrupted and ports/channels are not true candidates for reconfiguration unless they are in an inactive state.

PPAT REGISTRATION

All MAC modules' PPATs are automatically logged by the ANDIS Protocol Manager as they register using the RegisterModule Protocol Manager Request. All PPAT addresses are maintained by the ANDIS Protocol Manager in a structure of the following format:

| | | |
|---|---|---|
| WORD | Number of PPAT entries; | Number of PPAT addresses in the array |
| DWORD | PPAT address #1 | ;Array of PPAT addresses |
| DWORD | PPAT address #2 | ; |
| . | | ; |
| . | | ; |
| . | | ; |
| DWORD | PPAT address #n | ; |

PCMs, or other entities, can get this list of all of the registered PPATs from the ANDIS Protocol Manager. To obtain a copy of the Protocol Manager's PPAT list, a new Protocol Manager request has been created. The new request generally conforms to the Protocol Manager request calling guidelines outlined on page 62 of the NDIS 2.0.1 specification. The request's format and information is as follows:

GetPPATInfo

Purpose: Retrieve a copy of the Protocol Manager's PPAT registration list
Opcode 0x0C
Status Upon return contains the request's completion status
Pointer1 FAR Pointer to a buffer where the PPAT list is to be copied
Pointer2 Unused
Word1 Returned address type selector

ANDIS MAC DATA SUPPORT

The invention support for WANs also includes the ability for MACs to support the transmission and receipt of various "framed" data formats. This is due to the fact that asynchronous/synchronous analog, cellular, and digital (ISDN) networks support common framing techniques for data transport. The synchronous connectivities use HDLC framing techniques; the asynchronous connectivities use various pseudo-HDLC framing techniques. ANDIS standardizes the ability for MACs to support the transmission of LAN and HDLC data on demand (i.e., per "Bind Instance"; the time duration between NDIS BIND and UNBIND System Requests). This allows ANDIS MACs to support a greater number of protocols and network types. This is performed by specifying new MAC functions and standardizing the supported data frame formats.

For MACs that operate over protocol insensitive media (PIM), listed below are three ways to provide multi-protocol support. Other combinations of protocols would occur to those skilled in the art.

In a first preferred embodiment, all ANDIS PIM MACs must support standard IEEE 802.5 operations and Promiscuous/HDLC operations. This means that ANDIS MACs operate as native 802.5 (Token Ring) MACs unless a SetPacketFilter NDIS General Request is issued to the MAC with a FilterMask value of "Promiscuous" (0x0004). Once a MAC has received a SetPacketFilter request with a "Promiscuous" FilterMask, the MAC is simply required to verify that a received frame's (16-bit) FCS is good (this could be either hardware or software) and that the frame is at least 4 bytes in length including the FCS. If the data frame passes these minimal checks, it is passed up to the PD; if it fails, it is discarded and the appropriate statistics are updated. Non-LAN ANDIS MACs that support dynamic connections are assigned a StationAddress by the Protocol Driver binding to it; the MACs have no inherent "burned-in" LAN address of their own. This is done to prevent LAN address ambiguity among different connections and Bind Instances. Therefore, if an ANDIS MAC does not receive a SetStationAddress request by the time an OpenAdapter or SetPacketFilter request has been issued, it is assumed that the Binding entity wants to receive all frames.

Static/Configured ANDIS MAC Modal data support: In addition to the protocol support in the first embodiment above designated for ANDIS PIM MACs, PIM MACs can also support the static configuration of their base/default LAN protocol. This is accomplished by using a new keyword in the MAC's section of the Protocol.Ini file. The keyword is "MACTYPE=. . . " and the values it can be assigned for the default LAN mode can be either "802.5" or "802.3". Once assigned, this MAC type is static until potential reconfiguration occurs. If no keyword is specified, 802.5 is still the default MAC type. If the MAC type is set to "802.3", the MAC will operate as a native IEEE 802.3 (EtherNet) MAC unless it is put in Promiscuous/HDLC mode as described above. It is strongly recommended that ANDIS MACs, especially ANDIS MACs that support permanent connections, support the static configuration of the MAC's default/base LAN protocol.

Dynamic ANDIS MAC Modal data support: Further, ANDIS PIM MACs can support dynamic mode setting. This mode setting is performed while a MAC is not enabled to receive data (i.e., either while the adapter/MAC state is "Closed" or prior to the SetPacketFilter request). This is done via a new NDIS General Request called: SetProtocolMode. ANDIS MACs that support this General Request set Bit 19 of the service flags in the Service Specific Characteristics Table to "On". The SetProtocolMode request conforms to the NDIS General Request guidelines outlined on page 43 of the NDIS 2.0.1 specification.

All of the above are self explanatory with the exception of HDLC Filtered operations. A SetProtocolMode request with a protocol mode of HDLC Filtered mode affects the SetPacketFilter request. Once a PCM has put a MAC into HDLC Filtered Mode, it then issues SetPacketFilter requests with a standard FilterMask (see NDIS 2.0.1 pp. 48) and a FAR pointer (LPBUF) parameter to the following structure:
WORD Number of HDLC byte masks
BYTE(n) Array of one byte HDLC filter masks The FAR pointer is placed in the reserved DWORD pad parameter currently specified in the NDIS spec on page 48. MACs that support HDLC Filtered mode, use the supplied byte masks to verify that the first byte of each received, noncorrupt data frame matches one of these values or else it is discarded. Even though this mode is related to support for SDLC and LAPB, it could be used by any protocol needing a preliminary filtering mechanism.

The SetProtocolMode general request must be issued prior to the SetPacketFilter general request. SetProtocolMode sets a MAC's data mode, but SetPacketFilter activates it. This order is also analogous to current NDIS recommendations. The SetPacketFilter FilterMask overrides, or qualifies, any preceding requests. This means that a FilterMask of Promiscuous still puts a MAC into Promiscuous/HDLC operations regardless of the MAC's current protocol mode state. A second FilterMask value will activate all of the designated protocols with the exception of Promiscuous/HDLC.

In conjunction with the SetProtocolMode request, Bit 19 also indicates the presence of two new fields located at the end of the MAC's SSCT directly succeeding the WORD used for the maximum number of data blocks per buffer descriptor. These two fields reflect the protocol modes supported by a MAC and the current protocol mode. This allows PDs and other ANDIS entities to determine what functionality a MAC supports. The length field of the SSCT must reflect the presence of these two new indicators. Additionally, the MAC Type field in the SSCT should reflect protocol mode changes (i.e., the ASCIIZ MAC type should always be up-to-date).

ANDIS MAC DESIGN INFORMATION

OEM hardware and software vendors will supply the ANDIS Media Access Control (MAC) drivers to interface between the provided NDIS/ANDIS entities and their OEM hardware.

The majority of the invention's improvements over the Microsoft/3Com LAN Manager Network Driver Interface are primarily aimed at outlining MAC operations in the WAN/LAN dynamic connection environment. The term "dynamic connection" refers to those nonpermanent connections such as X & V-series circuit switched network connections, cellular dial-up connections, ISDN nonpermanent B & H-channels, and potentially ISO-LAN C-channels and so forth. Additionally, support for PCMCIA adapters falls under the category of dynamic connections since PCMCIA adapters can be inserted and retracted real-time. The Connection Type field in the PPAT denotes whether a MAC's underlying medium is dynamic or permanent. Examples of permanent connections are: X or V-series nonswitched lines, permanent ISDN B & H-channels and ISO-LAN P-channels. The major differences between the two types of connections are outlined in the bullets of the following "ANDIS MAC Attributes" section.

The term "Bind Instance" refers to the activity that occurs between NDIS BIND and UNBIND System Requests. The term "MAC Enabling processing" refers to all of the NDIS General Request verbs and associated responses that flow between a Protocol Driver and a MAC subsequent to the NDIS BIND System Request. These requests are used to setup and activate a MAC for data traffic and are described in the Bind Instance Flows detailed later. The term "Call Instance" refers to the activity that occurs between the connection of a call and the disconnection of the same call.

ANDIS MAC ATTRIBUTES

For each active port or channel, there is a single ANDIS MAC module interface. The term "interface" is used to enforce a one-to-one correlation between the medium and the logical MAC Modules presented to the higher layer NDIS/ANDIS entities such as Protocol Drivers. The ANDIS MAC attributes contained in the Service Specific Characteristics Table should be consistent across all ANDIS MACs.

In the Service Specific Characteristics Table (SSCT), the service flags value should be set to either 0000661D, 0000671D, 00006E1D, or 00006F1D hexadecimal (see NDIS 2.0.1 pp.13,14 for details). These flags indicate that the following features/functions are supported: broadcast frames, functional/group addressing, promiscuous mode, software settable station addresses, ResetMAC processing, receipt of 802.5 Source Routing frames and virtual (GDT) /physical buffer addressing.

In the Service Specific Status Table (SSST), the 32-bit MAC Status field should be initialized to either 00000017 or 00000007 hexadecimal depending upon the MAC's optional support of the OpenAdapter/CloseAdapter requests (see previous bullet). The status values indicate to the Protocol Drivers whether the MAC is always "open and ready for business" (i.e., active) or requires "Opening and Closing". As usual, unsuccessful MAC initialization would set the other pertinent flags.

In the ANDIS environment, MACs that support dynamic connections are not considered statically, or directly, "BINDable" entities. This means that the MAC Module names of such MACs are not to appear in the "Bindings=. . . " lists of PDs in the Protocol.Ini file. This prevents LAN or other non-ANDIS level PDs from attempting to use the MACs while they are in a disconnected state and to allow the Connection Manager the flexibility to dynamically Bind various PDs and ANDIS MACs together on a per Call/ Connection Instance basis. On the other hand, MACs connected to permanent mediums are directly "BINDable" just like existing NDIS MACs. These MAC Module names can appear directly in the "Bindings=. . . " list(s) of NDIS/ ANDIS PDs, whereas dynamic MACs require the assistance of the Connection Manager to perform Bindings on a dynamic per Call Instance basis.

All ANDIS MACs register with the ANDIS Protocol Manager regardless of their connection type. The only exception to this rule is that ANDIS MACs that are part of an integrated PCM Subsystem have no need to register their MAC modules due to the fact that they do not participate in static Binding and they have no PPAT to register. ANDIS registration performs two functions: 1) it logs all of the PDs end MACs for binding during Netbind.Exe processing, and 2) it logs all of the PPATs provided by the registering ANDIS MACs for interrogation by PCMs. All other NDIS Protocol Manager requests are unchanged.

ERROR/DISRUPTIVE CONDITION SIGNALING AND PROCESSING

The difference between "abnormal" versus "unexpected" conditions must be understood to design an ANDIS MAC in a way to flexibly handle and tolerate the timing conditions unique to supporting an NDIS MAC interface in a dynamic connection environment. An "abnormal" condition is one that is considered an error condition. It is an unexpected, nonprotocoled, severe, error condition that is either temporarily or permanently catastrophic to the operations in progress. Some of these conditions could be operating system failures, software errors, system resource depletion, hardware failures, microcode failures, etc. These failures effect MAC operations, but they can occur in a PCM and/or a MAC. These conditions are to cause the MAC to generate the appropriate NDIS StatusIndications which are delineated in one of the succeeding bullets.

"Unexpected" conditions, on the other hand, are those unanticipated events that though they may disrupt current MAC operations they are not necessarily errors nor are they considered catastrophic. The most common example in the WAN environment of an unexpected condition is a spurious call clearing incident during data transfer. The reason this type of event is not considered "abnormal" is because the call clearing process occurs in an architected, protocoled manner and even though it may be unexpected, it is not an error but an unanticipated event. Additionally, connection disconnection is an indigenous characteristic of dynamic connection environments. Therefore, it is not considered to be in the same class as the previously described error conditions.

Another situation is a call being prematurely, or unexpectedly, disconnected is not catastrophic; the call control software inherently handles and recovers from this type of disruption.

When a MAC that is "Bound to" and in an "Activated" state encounters an abnormal error condition, an NDIS AdapterCheck StatusIndication is issued to the current PD to notify it of the exception condition. Due to the fact that WAN/HDLC hardware and circuit switched environments do not encounter the same error conditions as LANs do, the only pertinent AdapterCheck reason codes available at this time are: 0x8000 Adapter (hardware) Inoperative, 0x000 Illegal Opcode, 0x0020 Transmit Overrun, 0x0010 Receive Overrun, and 0x0001 Program Request (PCM subsystem shutdown). The reason code that is closest related to the original exception is to be generated with the StatusIndication (see NDIS 2.0.1 pp. 55, 56). After AdapterCheck generation, the MAC is to remain in an "active" state waiting for the PD to either issue a ResetMAC, CloseAdapter, or UnBind general request.

When an "active" MAC encounters the unexpected loss of its connection due to spurious call disconnection ("clearing") from the DCE/network or remote node, it is to process events in the following fashion. All data that the MAC may have queued at the time of channel disruption is to be "flushed" as if it had been transmitted (i.e., Transmit-Confirms returned with SUCCESS return codes). All transmit requests after the time of channel disruption and prior to the MAC being either "Reset", "Closed" or "Unbound" are to be returned with an OUT_OF_RESOURCE return code or "eaten" (processed as SUCCESSful TransmitChains). All other requests are to be processed as usual. These requirements are levied so that the Connection Manager has time to notify the using applications of the unplanned call disconnection and get the protocol stacks shut down normally. This prevents the redundant, excessive reporting and processing of perceived errors by the protocol stacks and applications alike.

RELATIONSHIP OF PORT CONNECTION MANAGERS AND ANDIS MACS

ANDIS MACs that require connection management are unique in the fact that once they are "owned" by a PCM (i.e., after Register_PCM processing), they are logical extensions of that PCM for a given port or channel. The PCM Module for a given set of ports, or channels, is therefore the "parent" of all its associated MAC drivers. It is necessary then that the MACs and the PCMs must exchange specific configuration and error related information and coordinate certain events. The following items are operational design issues that require PCM-MAC interaction and coordination.

PCMs are the actual port/channel owners. PCM actions override events potentially occurring at the MAC's NDIS data interface. This means that the connection state of an ANDIS MAC is the ultimate state for the entire MAC. Until a MAC's connection is active and the PCM has put the ANDIS MAC into "NDIS Protocol Mode", the MAC's data paths are not enabled at the NDIS MAC interface. The only exception to this rule pertains to those ANDIS MACs that support permanent connections that can be activated without PCM intervention; there is no higher layer protocol or message passing required with the attached DCE/network. One example would be an ANDIS MAC that supported a nonswitched X or V-series connection. These MAC types can activate their connections at the OpenAdapter general request time frame if a PCM has not registered with them yet. When the PCM subsequently registers, the MAC processes the registration and then notifies the PCM that the connection is active. This optional deviation allows LAN NDIS PDs to operate over permanent connections in exactly the same fashion as over native LAN MACs.

Physical layer (Layer 1) parameters that can potentially vary per Call Instance are supplied to the ANDIS MAC by the sponsoring PCM. When the Connection Manager (CXM) passes a Call Setup request across the GCCI to a PCM, the dynamic Physical Layer parameters can be contained in the Call Setup information or derived by the PCM via its own configuration mechanism. The PCM is then responsible to pass the appropriate parameters to the associated ANDIS MACs to be used for the duration of that Call Instance. Static physical parameters can be configured either through a PCM's port/channel configuration and/or through a MAC's section of the Protocol.Ini file.

PCMs and MACs must interactively manage the occurrence of exception and error conditions. If a ANDIS MAC encounters a catastrophic error, or other unrecoverable internal/external condition related to its connection, it should generate an AdapterCheck NDIS StatusIndication to its Protocol Driver and then notify the parent PCM of the event (if the PCM is not already aware of the event). The PCM is then the responsible entity to perform the necessary RAS functions and notify the CXM of the exception condition. This allows the CXM to notify all of the related parties of the condition. Conversely, PCMs should notify their associated active MACs of unrecoverable environment errors, internal PCM errors, and disruptive network events. This allows the ANDIS MACs to generate the proper NDIS StatusIndications.

All PCMs are required to pass the Common Characteristics Table (CCT) address, which is the "BINDable" NDIS entity, of the active MAC to the Connection Manager in either the Call Setup confirm (outgoing calls) or Call Setup indication (incoming calls) verb information. This designates the active MAC for a given connection for the duration of a specific Call/Connection Instance. Integrated PCM Subsystems have the flexibility of statically or dynamically associating their MAC modules with the physical channels/ports on a permanent or per Call Instance basis. Whether a MAC was permanently or dynamically associated with a specific channel before the establishment of a call or connection, is irrelevant and transparent to the external environment.

In an integrated PCM Subsystem, the mechanisms whereby associated MACs and PCMs communicate are implementation specific. A tightly coupled example would be one where the bottom end of a PCM module and all of its associated MACs where incorporated into a single device driver. A loosely coupled example would be one where the bottom end of a PCM module were in one device driver and the associated MAC modules were contained in one or more other device drivers. Regardless of the method/packaging chosen, the only constraint is that the overall structure must perform adequately under all circumstances (i.e., no data or poll sequences are lost during call setup due to latency).

Figure 6:
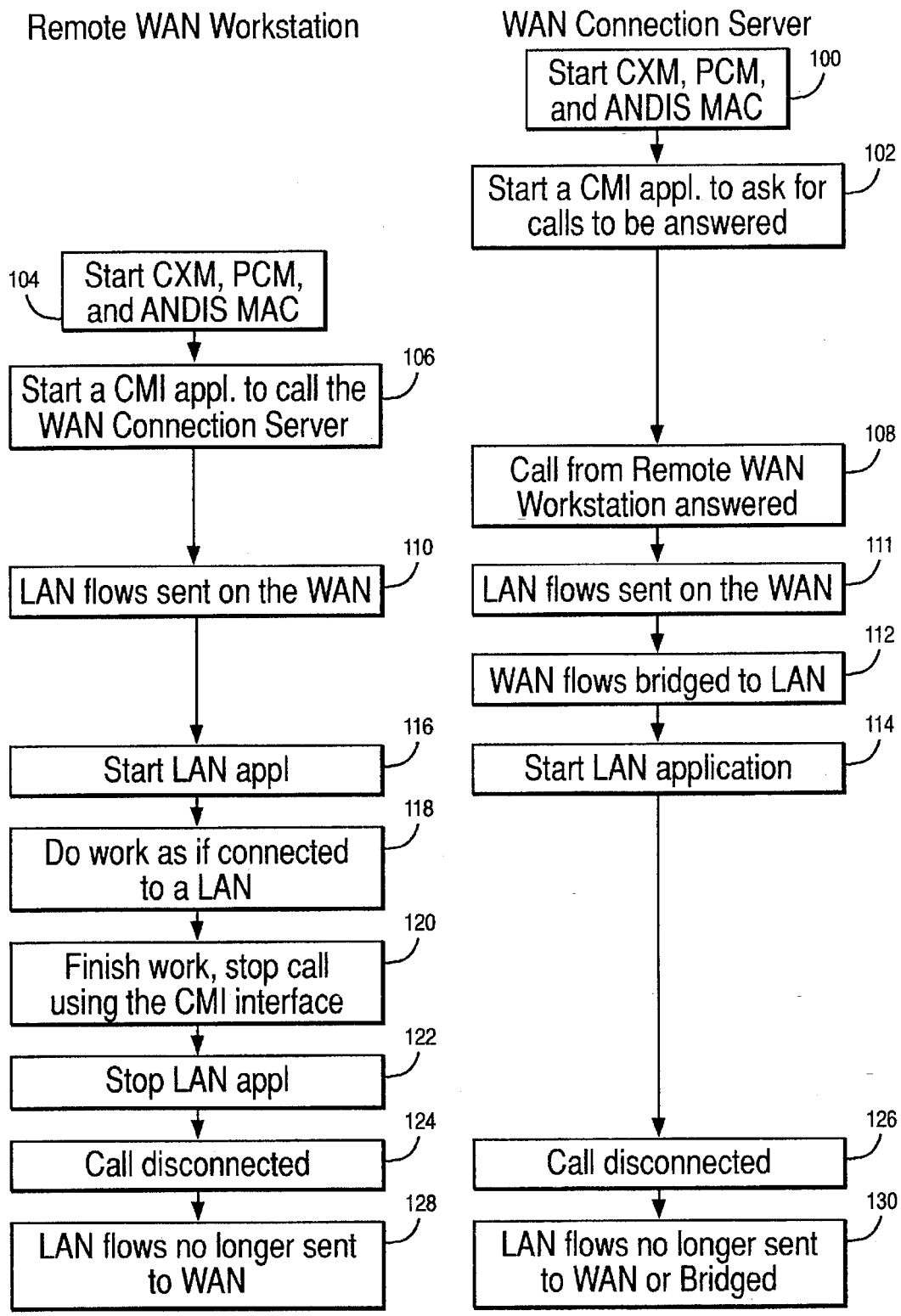
FIG. 6 is a flow diagram of the general process of communication between a remote WAN workstation and the WAN connection server coupled to the LAN.

A general dialog between a remote wide area workstation and a wide area network connection server is depicted in FIG. 6. The remote WAN workstation is coupled to the WAN connection server by means of a modem and the public switched telephone network. The WAN connection server is coupled both to the PSTN and the local area network on which, for example, a server application, which the remote LAN workstation wishes to use, is running. The process begins in step 100 where the Connection Manager (CXM), the Port Connection Manager (PCM) and the Advanced NDIS MAC are started. Next, in step 102, the administrator of the connection server starts a Connection Manager interface application and asks that all incoming calls be answered by the system.

Meanwhile, on the remote WAN workstation its complementary set of Connection Manager, Port Communication Manager and ANDIS MAC are started in step 104. In step 106, a Communication Manager interface application is started, in this case to call the WAN connection server. The call from the remote workstation is received and answered in step 108. In steps 110 and 111, the normal messages which would ordinarily be sent on a local area network are sent on the wide area network. Thus, to the applications, the fact that they are using a wide area network rather than a LAN is unnoticed. The WAN connection server also flows the information from the remote workstation elsewhere on the LAN if the server application is not resident on the same computer system that the LAN connection server is resident. In step 114 in the WAN connection server or other servers in the LAN and step 116 in the remote LAN workstation, the complementary portions of the LAN application are started. As mentioned above, the message flows between the applications are performed as though they were connected to a LAN as the Connection Manager, Port Connection Manager and ANDIS MAC handle any of the hardware differences transparently to the application.

In step 120, the user has finished work and issues a stop call using the Connection Manager interface application. In step 122, the user stops the LAN application. Note that two separate steps are taken by the user in steps 120 and 122. User intervention is necessary to prevent changes to the LAN application. The LAN application which understands the ANDIS environment could, of course, issue the calls to stop the connection once the user decides that he is finished with the LAN application. In steps 124 and 126, the call is disconnected from both the remote LAN and WAN connection server sides and, in steps 128 and 130, the systems are returned to a wait state where there are no communications over the LAN.

Figure 7:
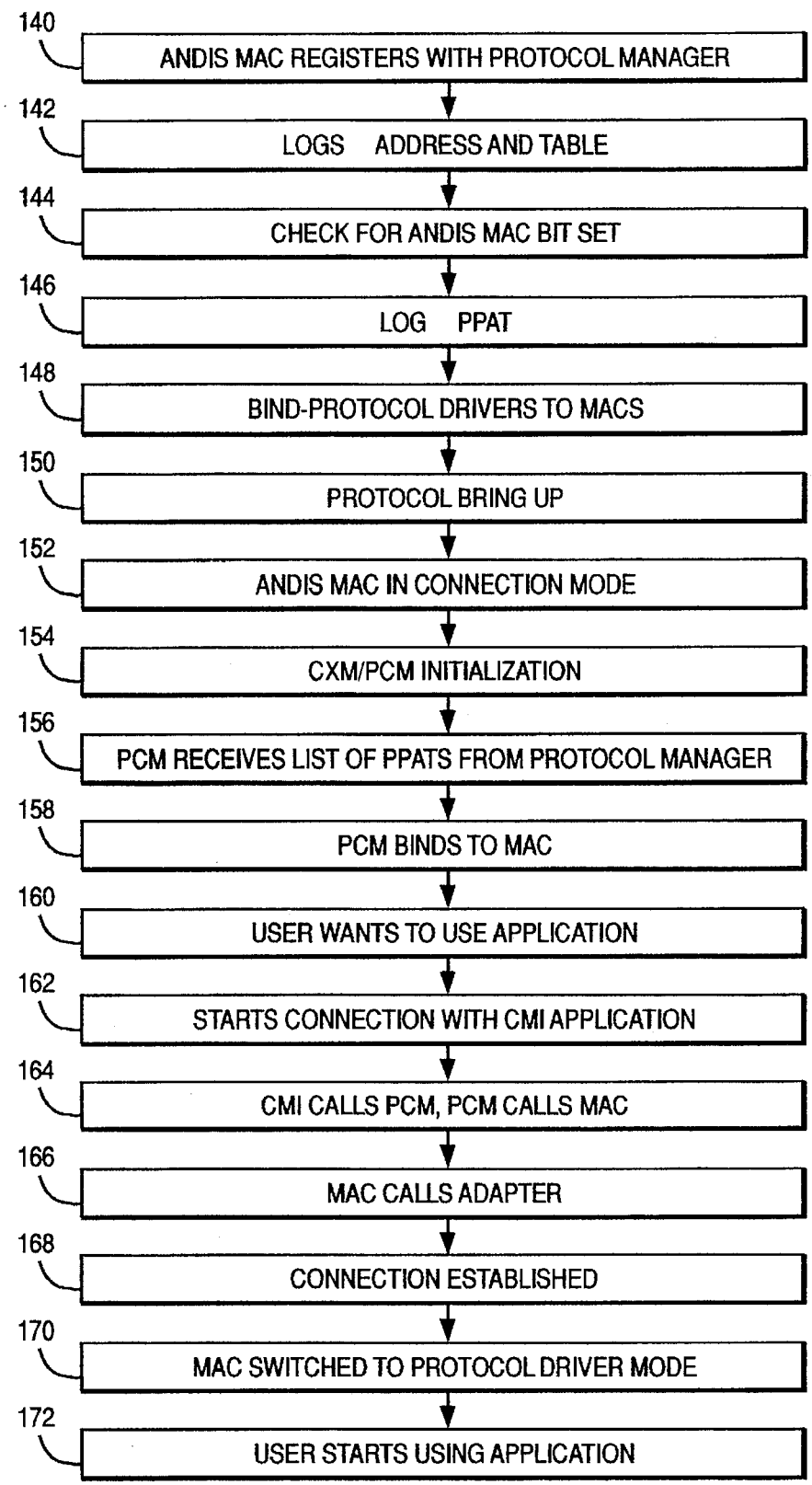
FIG. 7 is a flow diagram of a process that takes place in the calling system, e.g., the remote workstation, according to the present invention.

The general flow in FIG. 6 is described in much greater detail in FIGS. 7 through 11. FIG. 7 shows the process that is performed on a caller station such as the remote WAN workstation in FIG. 6. The process begins with the ANDIS MAC registering with the Protocol Manager, in step 140. The Protocol Manager registers the typical NDIS MAC addresses and tables in step 142. The Protocol Manager checks for an ANDIS MAC bit in step 144. If this bit has been set, the Protocol Manager knows to log the additional Physical Port Attributes Table, which was discussed in some detail above. Next, in step 148, the Protocol Drivers are bound to the MACs. A sample bind flow is discussed in greater detail in connection with FIG. 12 below.

In step 150, the protocol is brought up. At this time, step 152, the ANDIS MAC is connection mode. The Connection Manager and Port Connection Manager are initialized in step 154. This process includes step 156 where the Port Control Manager receives the list of PPATs from the Protocol Manager, and step 158 where the PCM calls to the appropriate MAC.

The system waits in readiness until the user wants to use a LAN application in step 160 by starting the LAN application. As the user knows that he must communicate on a wide area network, he starts the connection process by initializing the request on the Connection Manager interface application, step 162. The Connection Manager responds by calling the Port Connection Manager, the Port Connection Manager calls the MAC to make the connection, step 164. In step 166, the MAC Driver activates connection on the WAN adapter, e.g., a V-series modem, to make the physical call on the telephone network. In step 168, the connection over the WAN is established. In step 170, the MAC is switched to Protocol Driver mode by the PCM. In the Protocol Driver mode, the MAC behaves as if it was a normal NDIS MAC communicating on the LAN, rather than a MAC which had to be concerned with the connection status of the wide area network. In step 172, the user starts using the application as if he were on a LAN.

Figure 8:
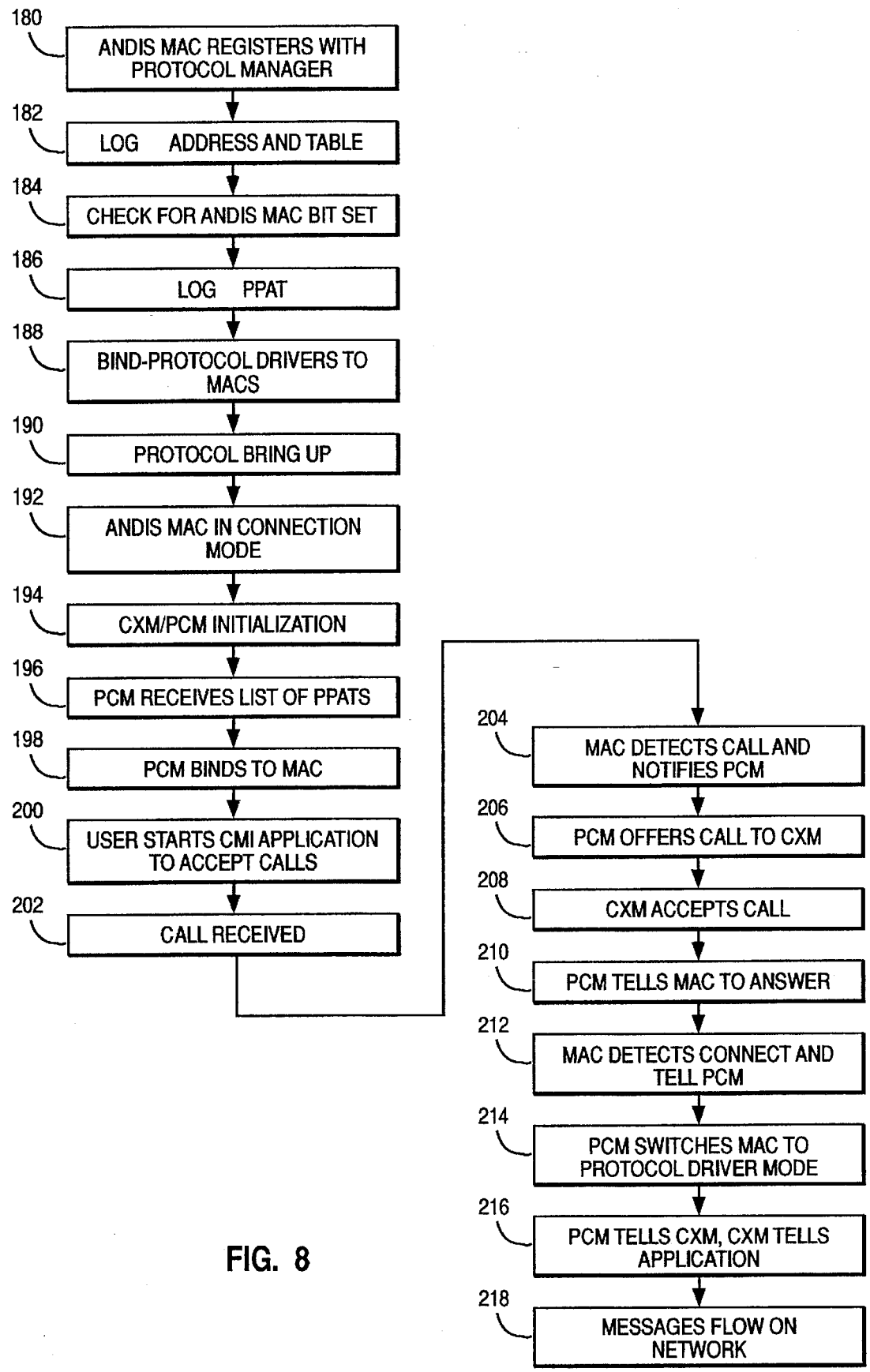
FIG. 8 is a flow diagram of the called station system, e.g., the WAN connection server.

The process which takes place on the called system, e.g., the WAN connection server in FIG. 6, is depicted in the flow diagram of FIG. 8. Steps 180 through 198 are essentially similar to steps 140 through 158 in FIG. 7, and will not be discussed further.

In step 200, the user starts the Communication Manager interface application telling the server to accept any call which is received. In step 202, the call is received over the WAN from the remote workstation. The MAC detects the call and writes the Port Communication Manager in step 204. The PCM offers the call to the Communication Manager in step 206, and the call is accepted by the Communication Manager in step 208. After the Communication Manager accepts the call, in step 210 the Port Communication Manager notifies the MAC to answer the remote workstation. The adapters on both sides of the WAN make the connection which the MAC detects in step 210 and informs the PCM that the connection is made. In step 214, the PCM switches the MAC to Protocol Driver mode which, as discussed above, allows the ANDIS MAC to behave as a NDIS MAC attached to a LAN, despite the fact that the workstation is, in fact, attached to a switch network. In step 216, the PCM notifies the Connection Manager that the connection is made. In turn, the Connection Manager notifies the LAN application that the connection is complete. In step 218, messages flow on the network.

Figure 9:
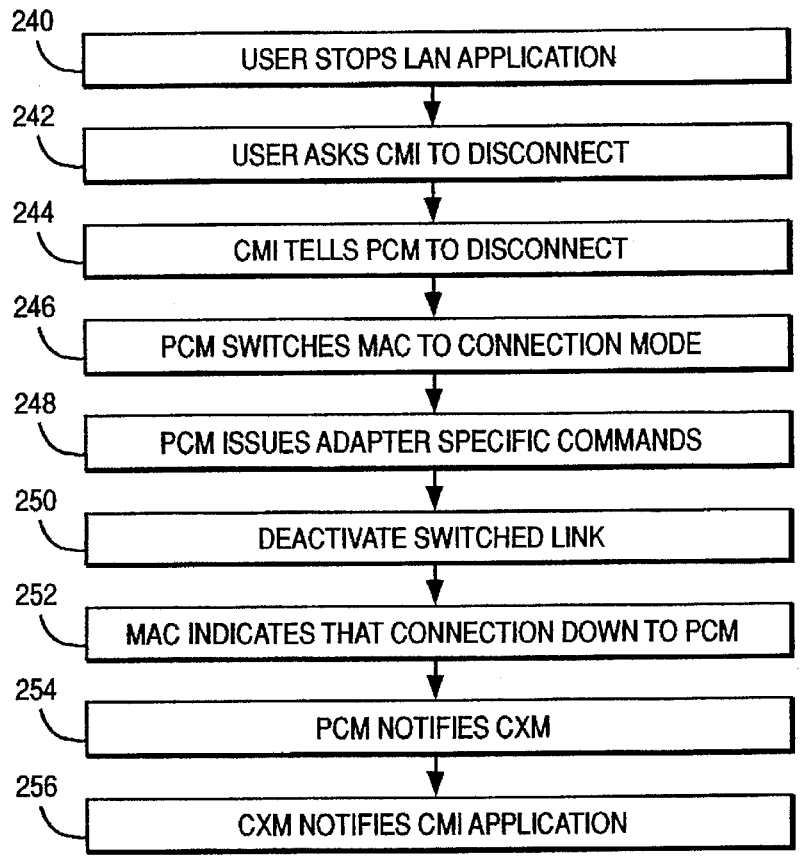
FIG. 9 is a flow diagram of the disconnection procedure in the disconnecting system.

The procedure for orderly disconnection from the wide area network is depicted in FIG. 9. It begins in step 240, where the user has decided to stop use of the LAN application. Next, in step 242, the user asks the Communication Manager interface to disconnect from the wide area network. The Communication Manager interface notifies the PCM to disconnect in step 244. In step 246, the Port Control Manager switches the MAC from protocol mode to connection mode. In step 248, the PCM issues adapter specific commands which are necessary to deactivate the modem. In step 250, the switched link to the LAN is deactivated. Once the link is deactivated, in step 252, the MAC indicates that the connection is down to the PCM. In step 254, the Port Connection Manager notifies the Connection Manager that the connection is down. In turn, the Connection Manager in step 256 notifies the Connection Manager interface application which notifies the user that he has successfully disconnected from the network.

Figure 10:
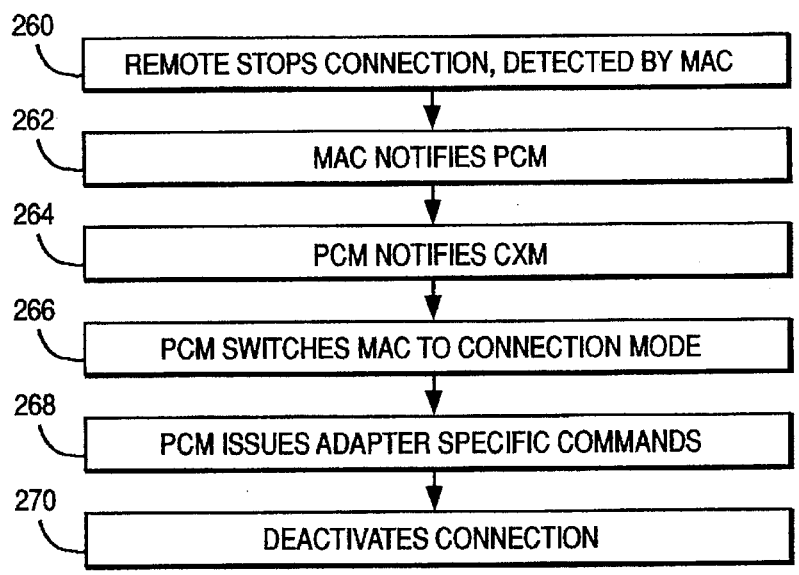
FIG. 10 is a flow diagram for the disconnection procedure in the disconnected system.

In FIG. 10, the disconnecting process in the workstation which did not initiate the process first, in step 260, the fact that the remote workstation has terminated the connection is detected by the MAC. In step 262, the MAC notifies the PCM of the lack of connection and, in step 264, PCM notifies the Connection Manager. The PCM switches the MAC to connection mode in step 266. The PCM also issues adapter specific commands to the modem to terminate the connection. In step 270, the adapter specific commands to the modem have redeactivated the connection. Although the connection had been previously severed by the remote workstation, by redeactivating the connection, extra phone charges or busy conditions can be avoided.

Figure 11:
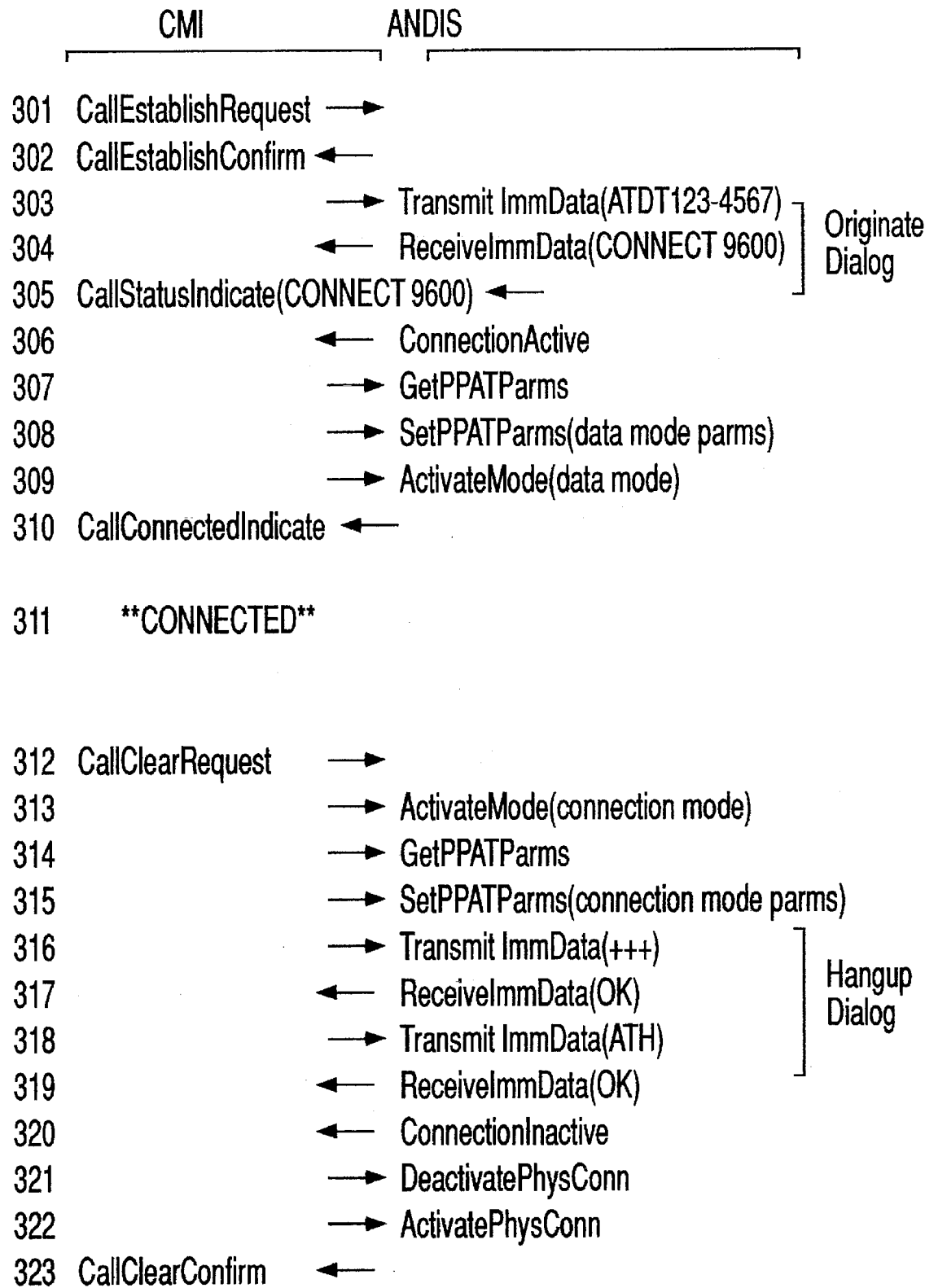
FIG. 11 is a flow diagram for an outgoing call using the connection manager and port connection manager.

The process for making an outgoing call with Connection Manager and the Port Connection Manager are described and shown in great detail in connection with FIG. 11. In step 301, the Connection Manager interface application requests that an outgoing call be made with a CallEstablishRequest verb. In step 302, the Connection Manager responds with the CallEstablishConfirm verb which indicates that the request has been accepted and a call attempt will be started. The Connection Manager notifies the PCM to issue the necessary commands to the modem and to dial the phone number 1234567 with the TransmitImmData verb. The modem sends the response back up through the MAC that a connection has been made to the network at 9600 baud with the ReceiveImmData verb. The fact that the connection has been made is handed up to the Connection Manager interface application in step 305 with a CallStatusIndicate verb. In step 306, the MAC informs the PCM that the connection is active. The PCM obtains the current PPAT from the MAC in step 307 from the GetPPATParms verb. In step 308, the PCM sets the data mode parameters for this call session with the SetPPATParms verb. Next, in step 309, the PCM switches the MAC into Protocol Driver mode and the MAC now routes all the received data to the protocol stack. In step 310, the call connection status is sent to the user interface in the Connection Manager interface application by the CallConnectedIndicate verb. In step 310, the application is connected across the LAN to the server application resident on one of the systems on the LAN. The Protocol Driver stack now uses the switch connection as if it were directly attached to a local LAN.

After the user has finished with the LAN application, he tells the Connection Manager interface application to end the connection. In step 312, the interface application issues the CallClearRequest verb to request that the call be cleared. In step 313, the PCM switches the MAC back to connection mode. In this mode, the MAC routes all the received data to the PCM. The PCM again, in step 314, gets the current PPAT from the MAC with the GetPPATParms verb. In step 315, the PCM sets the connection mode parameters with the SetPPATParms verb. In step 316, the PCM sends an escape sequence to the modem to get the modem back into command mode, Ibm in the modem response with the ReceiveImmData (ok) message indicating that it is ready to receive commands. In step 318, the PCM commands the modem to hangup the phone with the TransmitImmData (ATH) verb. The modem responds with the ReceiveImmData (OK) verb in step 319 indicating that it has hungup the phone. In step 320, the MAC informs the PCM that it is no longer active. In step 321, the PCM deactivates the physical connection to the modem. In step 322, the PCM reactivates the physical connection to the modem in preparation for the next call session. Finally, in step 323, the Connection Manager interface application is informed that the call is now cleared.

Figure 12:
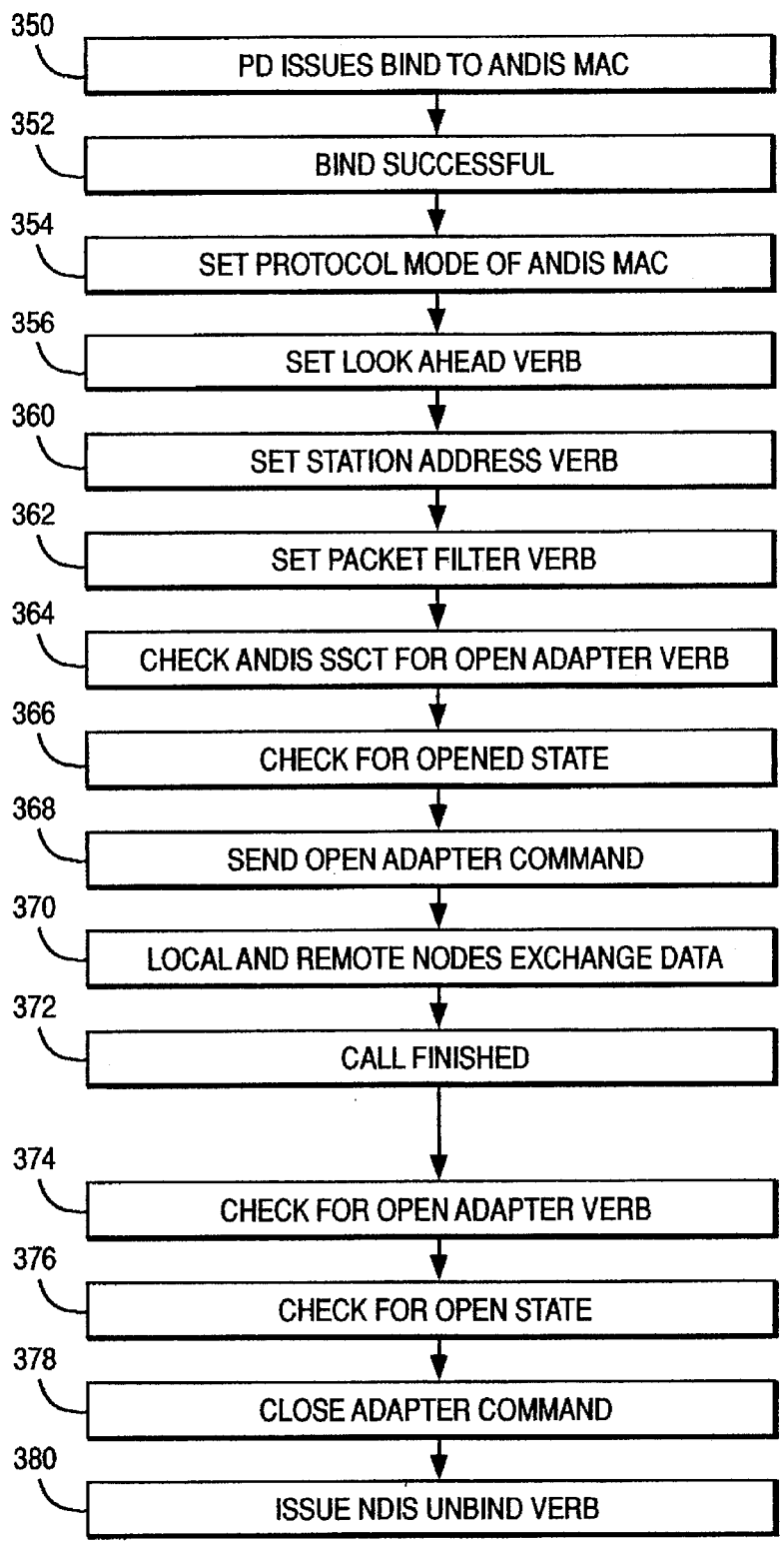
FIG. 12 is a flow diagram of a typical binding process for a typical LAN Protocol Driver to a MAC interface of the present invention.

FIG. 12 is a flow diagram of a typical binding process for a LAN Protocol Driver to a MAC interface. In step 350, the Protocol Driver (PD) issues an NDIS BIND verb to the ANDIS MAC. If the ANDIS MAC is a compatible type or if it supports the necessary type via the SetProtocolMode general request (Bit 19 of the service flags in the SSCT is "On"). In step 352, the BIND is successful. The Protocol Driver determines if it needs to set the MAC type via a SetProtocolMode request. If so, in step 354, the PD issues a SetProtocolMode request putting the ANDIS MAC into the proper mode. Otherwise, if the MAC is already a compatible type, this step is skipped and the PD proceeds to the next step.

The Protocol Driver next issues an NDIS SetLookAhead verb (buffer size=256 bytes) to the ANDIS MAC in step 356. If the SetLookAhead is successful, the Protocol Driver issues an NDIS SetStationAddress verb (passing a 6-byte LAN adapter address) to the ANDIS MAC in step 360. If the SetStationAddress is successful, in step 362, the Protocol Driver issues an NDIS SetPacketFilter verb (filter mask= directed, broadcast and source routing frames) to the ANDIS MAC. If the SetPacketFilter is successful, the Protocol Driver checks the ANDIS MAC's Service Specific Characteristics Table to see if this MAC requires an OpenAdapter verb in step 364. If it does, the MAC status flags in the MAC's Service Specific Status Table are checked to see if the MAC is in an "opened" state or not, in step 366. If not, in step 368, the Protocol Driver issues an OpenAdapter request to the ANDIS MAC. Otherwise, no verbs are issued after the SetPacketFilter for "activating" the MAC; it is considered "enabled".

In step 370, the local and remote nodes exchange data. In step 372, the call is finished.

When the Call Instance is through, the Protocol Driver checks to see if the ANDIS MAC supports the OpenAdapter/CloseAdapter verbs in step 374. If it does and the MAC is still in an "opened" state, step 376, the CloseAdapter verb is issued to deactivate the ANDIS MAC, step 378. Otherwise, no CloseAdapter verb is issued. The last step is to issue an NDIS UNBIND verb to the ANDIS MAC to detach the Protocol Driver and terminate the BIND Instance, step 380.

Figure 13:
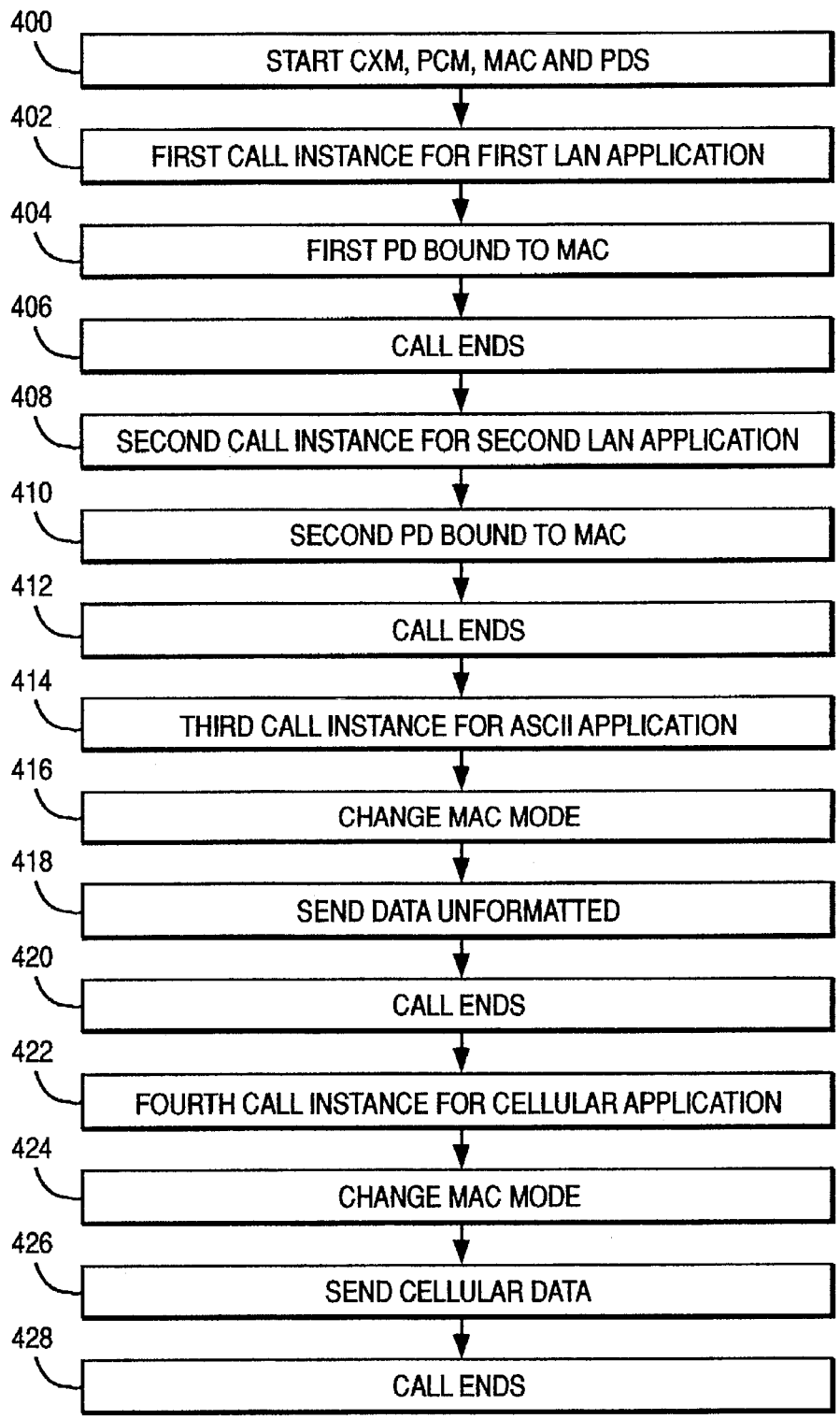
FIG. 13 is a flow diagram of a MAC driver switching between protocols and modes on different successive call instances.

Because the MACs in the present invention are modal, the protocol which they support is not fixed, but rather, depends on the Protocol Driver or other application which is bound to the MAC during the particular call. In the prior art, a single protocol and connection type would be supported. In FIG. 13, one possible flow diagram illustrates the flexibility of the present invention. The process begins in step 400 when the Connection Manager, the Port Connection Manager, the Media Access Control Driver and Protocol Driver are initialized. The user has decided that he wants to use a first LAN application which requires a first LAN protocol (for example, a token ring application). The Connection Manager informs the appropriate PCM which finds the MAC and Protocol Driver which will support token ring data streams and binds the Protocol Driver to the MAC in step 404. Traffic passes between the remote workstation and the station coupled to the LAN. The call ends; in step 406.

Next, in step 408, a second LAN application which requires EtherNet communications calls for access through the switched network to a LAN. The Connection Manager and Port Control Managers bind a second Protocol Driver to the MAC in step 410; this time, the Protocol Driver supports the EtherNet protocol. Thus, the MAC can support a number of LAN protocol data streams. The messages pass between a remote workstation and a workstation connected to the EtherNet LAN, not necessarily the same workstation in the first call instance. When concluded, in step 412, the call ends.

As the MAC is modal, it can also support unformatted data streams and non-LAN based protocols. For example, the process continues in step 414 where a third call instance calls for an ASCII application to communicate over the wide area network. In step 416, the MAC mode is changed to allow unformatted ASCII data to be sent over the network. In step 418, the unformatted data is sent on the switched network via the same MAC as in the first and second call instances. The call ends in step 420.

The architecture is also extendable allowing for the addition of, as yet, undefined protocols. For example, in step 422, a fourth call instance is initiated for a cellular application for some sort of cellular protocol. In step 424, the MAC mode is changed to the cellular mode and, in step 426, the cellular data is sent over the switched network. After the conclusion of the session, the call ends in step 428.

Although the examples above have been discussed in terms of extensions to the NDIS architecture, the invention can be applied to other LAN architecture which comply to IEEE/ISO Standards. For example, a Connection Manager, PCMs and MACs could be written for Novell Netware's ODI environment or the Clarkson Packet Driver environment.

While the invention has been described with respect to particular embodiments above it would be understood by those skilled in the art that modifications may be made without departing from the spirit and scope of the present invention. These embodiments are for purposes of example and illustration only and are not to be taken to limit the scope of the invention narrower than the scope of the appended claims. The invention is intended to be limited only as defined in the claims.

We claim:

1. A system for enabling a first computer to communicate over a switched network with a second computer located within a local area network connectable to the switched network, the first computer having a media access control driver for providing a communication channel to connect the first computer to the switched network, comprising:

means for placing the media access control driver in a first mode to establish a connection between the first computer and the second computer via the switched network;

means for placing the media access control driver in a second mode in which messages in a protocol of the local area network are passed between the first and second computers over the switched network;

means for managing a status of a connection between the first and second computers; and means for passing messages in the local area network protocol between the first and second computers when the media access control driver is in the second mode.

2. The system as recited in claim 1 wherein the means for placing the media access control driver in a first mode comprises a port connection manager which manages the communication channel when the media access control driver is in the first mode.

3. The system as recited in claim 2 which further comprises a hardware adapter to physically connect the first computer to the switched network.

4. The system as recited in claim 3 which further comprises:

a second media access control driver for providing a communication channel between the second computer and the switched network;

means for selectively placing the second media access control driver in a first mode in which a connection is established in the switched network or a second mode in which messages in the local area network protocol are passed between the first and second computers over the switched network; and a second hardware adapter to physically connect the second computer to the switched network.

5. The system as recited in claim 2 wherein the means for placing the media access control driver in a second mode includes the port connection manager.

6. The system as recited in claim 1 which further comprises a hardware adapter to physically connect the first computer to the switched network.

7. The system as recited in claim 6 wherein the hardware adapter is a modem and the switched network is a telephone network.

8. The system as recited in claim 1 wherein the media access control driver includes a table of parameters which describe the channel and a set of entry points to the channel.

9. The system as recited in claim 1 further including means for placing the media access control driver in a third mode in which unformatted data is sent over the switched network.

10. The system as recited in claim 1 further including means for placing the media access control driver in a third mode in which a non-LAN protocol is sent over the switched network.

11. A system for enabling a first computer to communicate over a switched network with a second computer located within a local area network connectable to the switched network, comprising:

a plurality of media access control drivers each for providing a respective communication channel to connect the first computer and the switched network;

a port connection manager for selectively switching at least one of the media access control drivers from a first mode to a second mode, wherein during the first mode the respective media access control driver establishes, takes down or manages a connection between the first computer and the second computer via the switched network, and wherein during the second mode the respective media access control driver passes messages in a protocol of the local area network between the first and second computers over the switched network; and a connection manager to manage a status of the connection; and a protocol driver to send messages in the local area network protocol when the respective media access control driver is in the second mode.

12. The system as recited in claim 11 wherein each of the media access control drivers include a table of parameters which describe the channel and a set of entry points to the channel and which further comprises a protocol manager which catalogs the tables.

13. A method for enabling a first computer to communicate over a switched network with a second computer located within a network connectable to the switched network comprising the steps of:

placing a media access control driver in a connection mode to establish a communication channel between the first computer and the switched network;

selectively switching the media access control driver from the connection mode to a protocol mode to facilitate passing of messages in a protocol of the network between the first and second computers over the switched network;

managing the communication channel with a port connection manager when the media access control driver is in the connection mode; and using the port connection manager to switch the media access control driver between the connection and protocol modes.

14. The method as recited in claim 13 which further comprises the step of managing a status of the connection with a connection manager.

15. The method as recited in claim 13 wherein the media access control driver includes a table of parameters which describe the channel and a set of entry points to the channel.

16. The method as recited in claim 13 which further comprises the steps of:

placing the media access control driver in an unformatted data mode; and sending unformatted data over the switched network while the media access control driver is in the unformatted data mode.

17. The method as recited in claim 13 which further comprises the steps of:

placing the media access control driver in a non-LAN protocol mode; and sending data in a non-LAN protocol over the switched network while the media access control driver is in the non-LAN protocol mode.

18. A computer program product for enabling a first computer to communicate over a switched network with a second computer located within a network connectable to the switched network, comprising:

a media access control driver which when resident on the first computer provides a channel to connect the first computer to the switched network;

means for selectively switching the media access control driver from a first mode to a second mode, wherein during the first mode the media access control driver establishes, takes down or manages a connection between the first computer and the second computer via the switched network, and wherein during the second mode the media access control driver passes messages in a protocol of the network between the first and second computers over the switched network;

a port connection manager which manages the channel when the media access control driver is in the first mode; and a connection manager to manage a status of the connection.

19. The product as recited in claim 18 wherein the port connection manager switches the media access control driver between the first and second modes.

20. The product as recited in claim 18 wherein the media access control driver includes a table of parameters which describe the channel and a set of entry points to the channel.

21. The product as recited in claim 18 wherein the media access control driver couples to a modem and the switched network is a telephone network.

22. The product as recited in claim 18 wherein the media access control driver has a third mode in which unformatted data is sent over the switched network.

23. The product as recited in claim 18 wherein the media access control driver has a third mode in which a non-LAN protocol is sent over the switched network.

24. A method for enabling a first computer to communicate over a switched network with a second computer located within a network connectable to the switched network, the first computer having a media access control driver, comprising the steps of:

establishing a connection between the first and second computer via the switched network;

selectively switching the media access control driver into one of a set of modes in which information is passed between the first and second computers over the switched network, the set of modes including a first mode for handling messages in a protocol of the network, a second mode for handling unformatted data, and a third mode for handling messages in a non-LAN protocol;

passing messages in the protocol of the network between the first and second computers when the media access control driver in switched to the first mode;

passing unformatted data between the first and second computers when the media access control driver is switched to the second mode; and passing messages in a non-LAN protocol between the first and second computers when the media access control driver is switched to the third mode.

* * * * *